United States Patent [19]
Hamilton

[11] Patent Number: 6,125,399
[45] Date of Patent: Sep. 26, 2000

[54] COMPUTER SYSTEM INCLUDING A PLURALITY OF NODES FOR TRANSFERRING THROUGH A DATA TRANSFER NETWORK MESSAGES HAVING DISTINGUISHING FIELDS USED FOR DISTINGUISHING THE MESSAGES AND CONTROLLING RECEIPT THEREOF

[75] Inventor: Patrick Hamilton, Machida, Japan

[73] Assignee: Hitachi, Ltd., Tokyo, Japan

[21] Appl. No.: 09/061,328

[22] Filed: Apr. 17, 1998

[30] Foreign Application Priority Data

Apr. 18, 1997 [JP] Japan .................................. 9-101320

[51] Int. Cl.[7] .......................... G06F 15/16; G06F 15/173
[52] U.S. Cl. ......................... 709/245; 709/205; 709/238; 709/240; 370/392; 370/400
[58] Field of Search .................................... 709/200–201, 709/206–207, 238–246, 250; 370/389, 392, 395–400, 471

[56] References Cited

U.S. PATENT DOCUMENTS

| | | | |
|---|---|---|---|
| 4,723,208 | 2/1988 | Chadima, Jr. et al. | 709/251 |
| 5,150,463 | 9/1992 | Ward et al. | 709/217 |
| 5,167,019 | 11/1992 | Fava et al. | 709/240 |
| 5,446,734 | 8/1995 | Goldstein | 370/397 |
| 5,477,536 | 12/1995 | Picard | 370/400 |
| 5,491,801 | 2/1996 | Jain et al. | 709/241 |
| 5,530,806 | 6/1996 | Condon et al. | 714/49 |

*Primary Examiner*—Zarni Maung
*Assistant Examiner*—Bharat Barot
*Attorney, Agent, or Firm*—Antonelli, Terry, Stout & Kraus, LLP

[57] ABSTRACT

A computer system having a plurality of processing nodes interconnected by a message transfer network. Each node includes an instruction processor, a transmit circuit to transmit messages to other processing nodes through the message transfer network and a plurality of postings in a memory storage. Each message includes a header part and a data part with the header part having distinguishing fields that are used to distinguish messages. Each posting includes message specification fields corresponding to each distinguishing field of a message header part wherein the message specification fields selectively matching the distinguishing fields of a message. Each posting further includes a posted control field wherein the posted control field is used to control the operation of a receive circuit with respect to a message matching the posting. The receive circuit enables receiving of messages sent by other processing nodes through the network, searching upon reception of each message for and locating a posting having message specification fields that match the corresponding distinguishing fields of the message being received and to control upon location of a posting, the posted control field to control the operation of the receive circuit with respect to the message being received.

32 Claims, 19 Drawing Sheets

COMPUTER SYSTEM INCLUDING A PLURALITY OF NODES FOR TRANSFERRING THROUGH A DATA TRANSFER NETWORK MESSAGES HAVING DISTINGUISHING FIELDS USED FOR DISTINGUISHING THE MESSAGES AND CONTROLLING RECEIPT THEREOF

BACKGROUND OF THE INVENTION

The present invention relates to a data transfer network for transferring data in the form of messages.

Many software applications written for parallel computer systems, particularly those with distributed memory, use a message passing software library as an interface between the application software and the communication network hardware. MPI: A Message-Passing Interface Standard is an example of such a library.

In the case of MPI, the library is implemented as software routines that may be called by application software and are executed by the instruction processor in each node of a parallel computer. The instruction processor controls the node's transmit and receive circuits that are connected to the other nodes of the system via a network.

There are two fundamental software routines in libraries that follow the MPI standard, one being a send request routine that is used to request the sending of a message to another node in the system, and the other being a receive request routine that is used to request the reception of a message.

When an application calls the send request routine to send a message, it specifies several parameters including: the destination node number of the message, each node having a unique identifying number; the message tag value that may be used by the application to distinguish different types of messages; a communicator value that is used to specify the communication context of the send transmission, messages being received only within the same communication context; the address of the data to be sent in local memory; and the quantity of said data.

When an application calls the receive request routine, it specifies the message that it would like to receive and where it should be written in local memory. These parameters are passed to the receive request routine and include: a tag specification which may specify either a specific tag or alternatively a wildcard tag value; a source specification which may specify either a specific source or alternatively a wildcard source value; a communicator value that is used to specify the communication context of the receive transmission, the receive request matching only messages sent within the same communication context; the address of the destination buffer in local memory; and the size of the destination buffer.

The receive routine results in either the immediate return to the application of a message that matches the receive message specification if the message has already been sent to the node, or if the request cannot be completed immediately, the information relating to the request is recorded, this record being called a "posted receive", so that when a request to send such a message is later issued, the receive routine may then complete and return the message to the application software. The MPI standard also specifies that messages should be non-overtaking, meaning that if more than one pending receive request matches a message, then the oldest pending receive request should be satisfied by the message.

An example of hardware that is used to transfer a messages from local memory in one node to that of another node is described in the Japanese patent application that has been made public, number 6-324998. An embodiment of such hardware is represented by FIG. 3. A plurality of nodes are connected to a message transfer network 902, for simplicity, only one node 901 is shown. Each node contains an instruction processor or IP 903, local memory 904 and a network interface adapter or NIA 905 that are all linked together by a bus 906. The NIA 905 contains a transmit circuit 908 and a receive circuit 910 that are connected to the network 902 via a transmit network connection 909 and a receive network connection 911 respectively. A network message 912, including message data 917 has a message header that contains a DNN field 913 that specifics which node should receive the message, as well as a Tag field 916. Within the receive circuit, there is an input port 918, a receive sequencer 919, a direct memory access controller [DMAC] 921, and a receive posting register 920. Upon arrival of a message to the input port 918, the Tag field 916 of the message is checked against a tag field held within the posting register 920. If there is a match, the DMAC 921 is commanded by the receive sequencer 919 to use the user receive buffer 933 to receive the message data 917. The address pointer 932 to the user receive buffer 933 also is located within the posting register 920 and the user receive buffer 933 typically is located with the user's application space 934 in local memory 904. If there is no match, the message is received in the message buffer 941 in local memory.

This hardware provides a receiver that supports only a single posted receive request for a message. It also includes a message buffer for recording messages that do not match the receive posting register. This message buffer can be considered as a message pool, and the described hardware supports only a single message pool.

Using the hardware described above, it is possible to request the reception of only a single message at a time using the receive posting register. However, most message passing libraries, including MPI, support a large number of simultaneously active receive requests and also support wildcards.

If an MPI message passing library were to be implemented that tried to take advantage of the single receive request posting register described above, the library would only be able to use it to post one pending receive request and only if this request did not use wildcards. Also, if it was desired to post a request other than the oldest pending request, in order not to violate the message ordering rules of MPI, it would only be possible if none of the older requests could also match the same message. There would also be software overhead involved with checking for such receive conflicts. After reception of the message posted using the receive request register, the receive circuit would have to interrupt the instruction processor in order for the instruction processor to post another request using the receive request register. This would lead to frequent instruction processor interrupts and increased software overhead tending to reduce the effective processing power of the instruction processor. Meanwhile, messages that are received by the receive circuit in an order different from the order in which the corresponding receive requests were issued by software would be written to the pool. Such messages received by the pool would still have to be copied to the destination buffer by the instruction processor, thereby further reducing performance.

An alternate method of implementing an MPI library using the above-described hardware would involve the exchange of control messages between nodes prior to actual transfer of a message. These control messages could be used to configure the receive posting register before the actual message is transferred and could ensure that block copy operations of message data to the destination buffer are not required. However, such a solution has serious performance problems in that message transfer latency would be large due to the overhead of transferring the control messages. Secondly, due to the asynchronous nature of the control messages, frequent instruction processor interrupts would be required to service them, thus reducing the effective processing power of the instruction processor.

Further, if there are software tasks other than the communicating task running on a node and the communicating task would like to sleep while waiting for a message, it is not possible to set the receive circuit to cause an instruction processor interrupt for more than one particular message. It would be necessary to enable interrupts for reception of messages to the message pool. The interrupt handler software routine would have to check the message pool for reception of the particular message each time a message was received by the receive circuit.

Furthermore, if there are multiple communication contexts in use by a single node, it is not possible to assign separate message pools for messages belonging to these separate communication contexts. If many messages are sent within a single communication context, this can cause pool space for all communication processes to run-out.

SUMMARY OF THE INVENTION

The present invention solves the problem of how to post multiple messages that may be simultaneously pending and eliminates unnecessary copying of message data from an intermediate receive buffer pool to the final destination buffer in local memory that is specified by the receive request when the address of this final destination buffer is known before the message is actually received. Copying data between areas of local memory wastes instruction processor time and increases the message transfer latency.

Secondly, the present invention extends the way that a message to be received is specified so that it may include multiple parameters, some of which may include wildcard values. This simplifies implementation of message passing libraries that support receive requests that may specify wildcards and also eliminates unnecessary copying of message data.

Thirdly, the present invention makes it possible for receive requests to be matched to incoming messages in the order that the receive requests were issued. This simplifies implementations of message passing libraries, such as MPI, that require such ordered matching of messages to receive requests.

Fourth, the present invention solves the problem of how to assign communication contexts to different message pools such that a pool overflow in one communication context does not affect message transfers to message pools in other communication contexts.

Fifth, the present invention solves the problem of unnecessary instruction processor interrupts while the instruction processor is waiting to receive a particular message or type of message or a message from a particular source. Unnecessary interrupts reduce effective processor power of the instruction processor.

In a message passing data transfer network of the present invention, message headers include source, dest, tag and comm fields, the source field uniquely identifying the transmitting node, and the dest, tag and comm fields being specified by message transmit requests issued to the transmit circuit. Messages are routed by the network to the target node uniquely identified by the dest field. Receive requests may specify the source, tag and comm fields of the message to be received, the source and tag fields possibly being specified as wildcards. Receive requests are time stamped and are posted by means of a hash table in local memory that, upon message arrival, is searched by the receive circuit for the oldest matching active receive request, the source wildcard or tag wildcard receive specifications matching a message with any source or any tag field, respectively. If a matching posted receive request is found, the receive request is carried out. Receive requests may also specify buffers into which the matching message data is to be written directly by the receive circuit. In this case, the receive request is consumed and is unposted from the hash table. Alternatively, receive requests may specify a particular message pool into which the message is to be received, in this case receive requests may also be specified as persistent receive requests that remain active after being performed. Typically software posts persistent, source wildcard, tag wildcard, receive requests with timestamp values into the distant future for each value of comm in use. These act as default receive requests for messages that match no other posted receive requests. If so, specific receive requests from application software that are issued after message arrival may be matched by software to the message in a message pool, and the message is copied to the application.

Unnecessary interrupt requests are reduced by including an interrupt request bit field in the control data structure in local memory corresponding to each receive request and means for the receive circuit to cheek this bit to determine whether to interrupt the instruction processor.

Implementation of a receive posting search mechanism in hardware considerably reduces message latency by reducing the number of control messages that have to be sent, reducing instruction processing overhead associated with servicing interrupt requests, and eliminates data block copy operations for the case where a receive request is issued before message arrival.

Initially, library software on each node creates receive posting hash table structures in local memory and posts persistent, source wildcard, tag wildcard, receive requests with timestamp values into the distant future for each communication context. These default receive requests serve to receive any messages not matching any other posted receive requests to a message pool.

At any time, application software executing on a node may issue a send request to the communication library software. The library forwards the request and a comm value identifying the communication context of the send request to the transmit circuit. The transmit circuit creates a message header which includes dest and tag fields according to the send request, a source field uniquely identifying the transmitting node and the comm field. The transmit circuit then appends the message data and transmits the completed message to the network.

Messages are routed by the network to the target node uniquely identified by the dest field in the message header. Note that the network uses a fixed routing algorithm meaning that all messages sent from one node to another node all use the same route. This is to prevent message over-taking.

At any time, application software executing on a node may issue a receive request to the communication library software. First, the library checks the message pool that corresponds to the communication context for a previously received matching message. If none is found, the library posts a time stamped receive request in the hash table with a comm value identifying the communication context of the receive request and with values of tag and source as specified in the receive request, the source and tag fields possibly being specified as wildcards. Each receive request also contains a control bit to request an instruction processor interrupt upon completion of the receive request. This control bit is modifiable at any time up until receive completion.

Upon arrival of a message, the receive posting hash table in the destination node is searched by the receive circuit for the oldest matching active receive request, source wildcard or tag wildcard receive specifications matching a message with any source or any tag field respectively. Case one: In this case, the previously posted receive request does not match the message. The message is received using a default receive request to a message pool. Upon subsequent issue of a receive request by application software, the message will be copied from the message pool to the application. Case two: A matching posted receive request is found. In this case, the receive request is performed, and the receive buffer specified by the receive request is written directly by the receive circuit. The interrupt request control bit of the receive request is checked and, if set, an instruction processor interrupt occurs.

DETAILED DESCRIPTION OF THE PREFERRED EMBODIMENTS

Prior to a detailed description of various embodiments of the present invention, there will be a brief summary of the MPI.

The MPI specification describes a software interface between application software programs and a software communication library. An MPI software library typically appears to the application software as a set of software subroutines callable by application software.

Communication is by means of messages passed between software processes typically executing on different nodes. The most primitive of the MPI literary software subroutines are the send and receive subroutines. In order to issue a request to send a message from one software process to another software process, the sending process calls the send subroutine. In order for the receiving process to issue a request to receive a message it must call the receive subroutine. If a message that matches the one specified by the receiving process has already been sent, then the receiving process may be immediately carried out. If no message that matches the one specified by the receiving process has been sent, then the receive request remains pending until such a message is sent.

According to the MPI specification, MPI messages include a 'message envelope' in addition to the data part. The message envelope consists of a fixed number of fields that can be used to distinguish and selectively receive messages. These fields are: source, destination, tag, and communicator. The message source is implicitly determined by the identity of the message sender. The other fields are specified by the arguments in the send operation. A communicator specifies the communication context for a communication operation. Each communication context provides a separate "communication universe"; messages are always received within the context they were sent, and messages sent in different contexts do not interfere.

The MPI standard also specifies that messages are non-overtaking. If a sender sends two messages in succession to the same destination, and both match the same receive, then this operation cannot receive the second message if the first one is still pending. If a receiver posts two receives in succession, and both match the same message, then the second receive operation cannot be satisfied by this message, if the first one is still pending.

Figure 1:
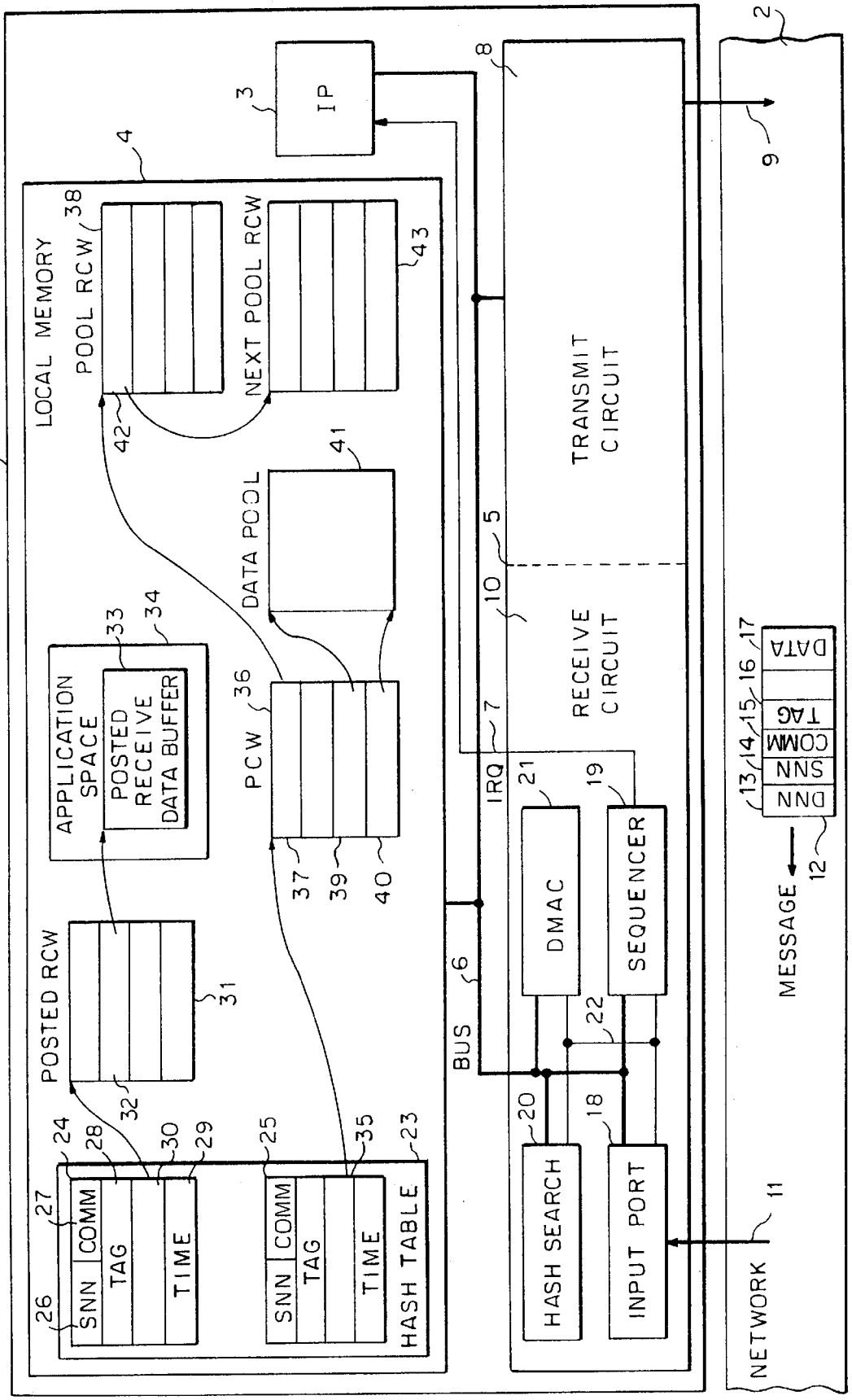
FIG. 1 is a block diagram of a node that uses the invention connected to a message passing network.
Figure 2:
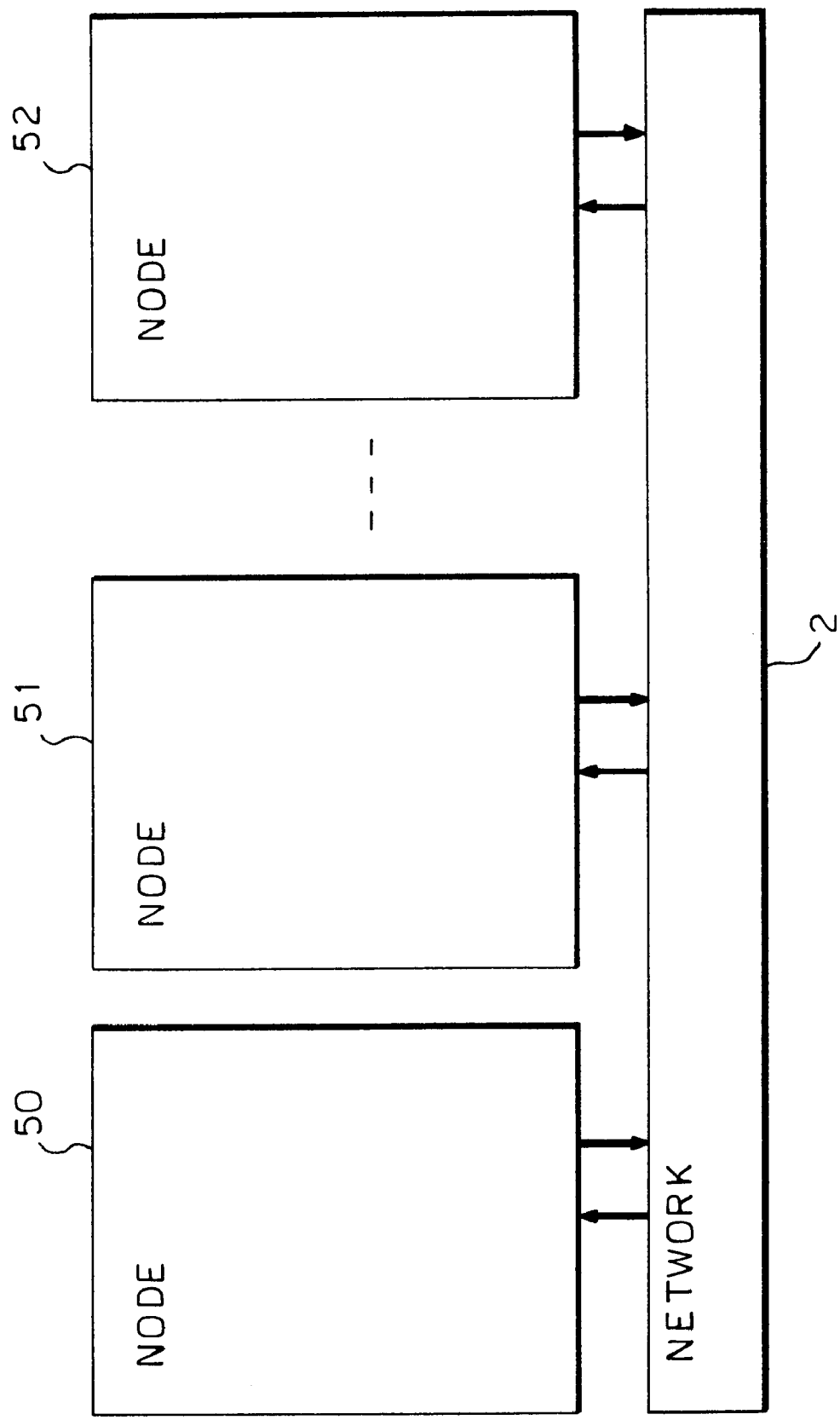
FIG. 2 is a block diagram of a multiple node system connected to a message passing network.
Figure 3:
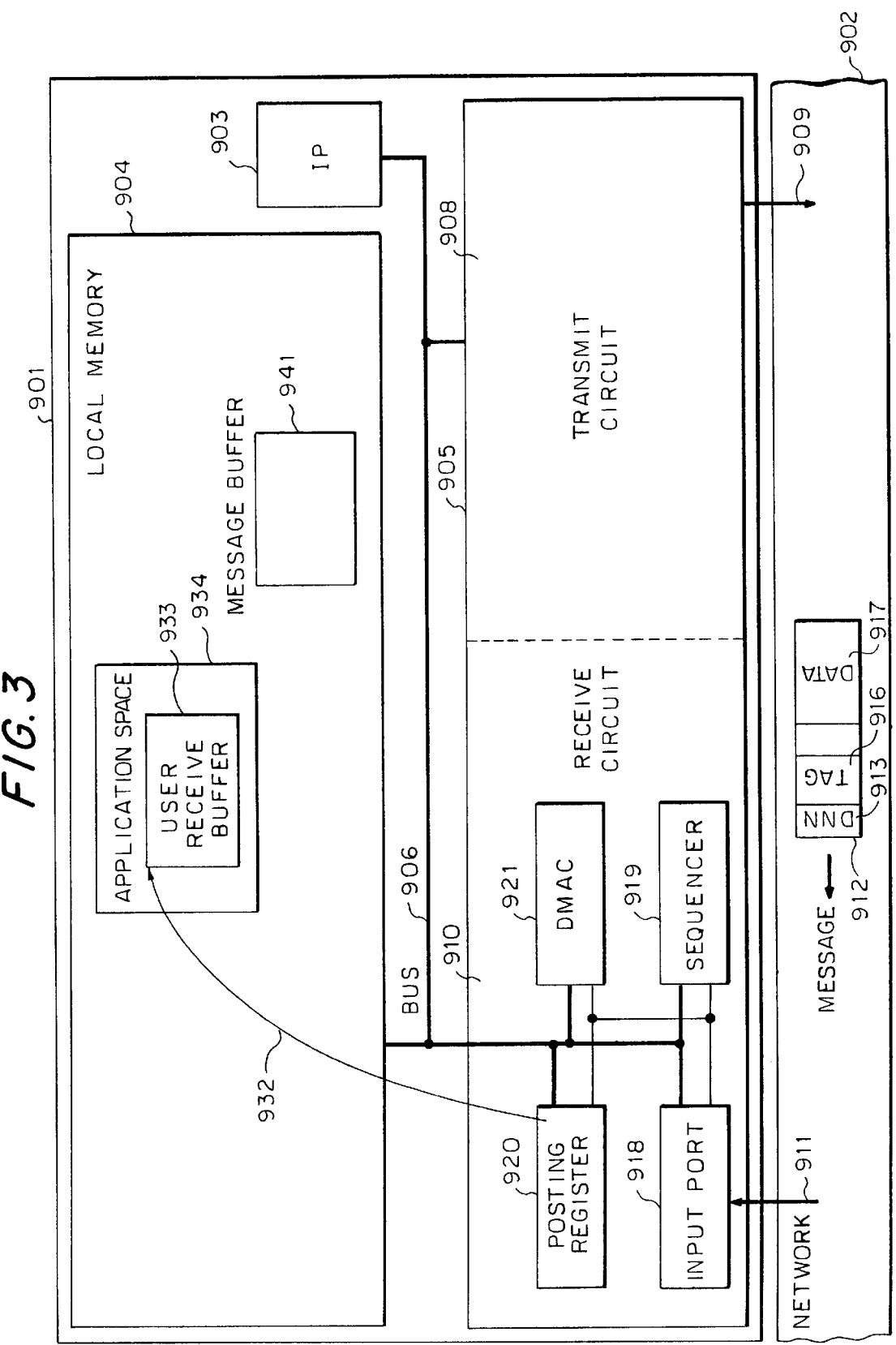
FIG. 3 is a block diagram showing a prior system.

An object of the present invention is to provide a network communication system with an interface between hardware and software similar to that described by the MPI specification so as allow implementation of an MPI compliant software library that uses the device interface with little library software latency overhead and little overhead caused by instruction processor interrupt requests. One embodiment of the present invention is represented by FIG. 1. It is a computer system that includes of a plurality of nodes that are linked by a network (2). For simplicity, only one node (1) is shown. FIG. 2 shows the manner in which a plurality of nodes (50, 51, & 52) are linked to the network (2). Any plurality of nodes may be thus linked together by the network (2). The node (1) shown in FIG. 1 is just one node of the system, each of the other nodes are similar to this node (1). Each node has a node number to uniquely identify the respective node in the system and which uniquely identifies each communication process in the system.

The node (1) contains an instruction processor (3) called the IP, a local memory (4), and a work interface adapter (5) called the NIA. These are linked together within the node via a bus (6). The bus (6) permits shared access to the local memory (4) by the IP (3) and by the NIA (5). The bus (6) also allows the IP (3) to directly access certain registers within the NIA (5). There is also an interrupt request line (7) from the NIA (5) to the IP (3) to permit the NIA (5) to request service from the IP (3).

The NIA (5) includes a transmit circuit part (8) that has a transmit port connection (9) to the network (2) and a receive circuit part (10) that has a receive port connection (11) from the network (2). Messages are assembled by the transmit circuit (8) and are transmitted to the network. Such a message (12) is shown in FIG. 1. The message (12) has a message header part and a data part (17). The message header part includes a destination node number or DNN field (13), a source node number or SNN field (14), a communicator or Comm field (15), and a Tag field (16). The network (2) uses the DNN field (13) to determine which node the message should be forwarded to. The SNN field (14) contains the unique node number corresponding to the transmitting node. The Comm field (15) contains a value assigned by the transmitting node's software that identifies the communication context to which the message belongs. The tag field (16) value is assigned by application software to help distinguish between multiple messages.

The network (2) is a packet switched network that routes messages from transmit circuits to the appropriate receive circuits according to the DNN field contained within the header part of each message. The messages are routed in a non-overtaking manner so as not to violate the MPI standard requirement that messages are non-overtaking.

The receive circuit (10) is used to receive messages from the network (2) that are destined for the node. The receive circuit (10) includes of an input port controller (18), a receive sequencer (19), a hash table search controller (20), and a direct memory access controller or DMAC (21). These controllers are linked to the bus (6) and to each other via control and status signals (22). The input port controller (18) is connected to the network (2) via a receive port connection (11) and is used to accept messages from the network (2).

The DMAC (21) is used to control reads from and writes to local memory (4) via the bus (6). The hash search controller (20) is used to search the receive posting hash table (23) in local memory (4) for an entry that matches the SNN, Comm and Tag fields of the message header. The receive sequencer (19) oversees operation of the other controllers, controls the fetch and update of memory structures in local memory (4) and controls interrupt requests generated by the receive circuit (10).

One part of the present invention particularly concerns the operations surrounding reception of a message. Before a message can be received, software must create various structures within local memory (4) that are used both by the receive circuit and by software. A receive posting hash table (23) is used to post receives. This table contains hash table entries hereinafter called HTEs. The HTE marked (24) is an example of a valid HTE. The valid HTE (24) contains an SNN field (26), a Comm field (27), and a Tag field (28). The SNN (26) and Tag (28) fields may possibly be programmed by software to contain special values that represent wildcard values. Upon reception of a message by the receive circuit (10), the hash table is searched for any HTEs that have a receive specification that matches the SNN, Comm and Tag fields of the message header. The HTE (24) also contains a Time field (29) that is used in the case where multiple valid matching trash table entries are found by the receive circuit (10). In this case the receive circuit (10) selects the hash table entry with the oldest time field value. The particular HTE marked by (24) also contains a pointer (30) that points to a posted receive control word (31) called a posted RCW. The posted RCW (31) is fetched by the receive circuit (10) and describes where the message should be received. In the case of the posted RCW marked (31), the posted RCW contains a pointer (32) to a data buffer (33) in local memory. Typically, the data buffer (33) is contained within the application space (34) of the application that issued the receive request. The receive circuit (10) updates the HTE (24) to indicate that the posted RCW (31) has been used, records the message header in the posted RCW (31) and writes the message data to the data buffer (33). Alternatively, a HTE, for example the HTE marked (25), contains a pointer (35) that points to a pool control word (36) called a PCW. The PCW (36) is used to maintain a pointer (37) to a chain of empty pool receive control words called pool RCWs, and a head pointer (39) and a tail pointer (40) of a data pool (41). The pool RCWs are in the form of a chain and the PCW (36) contains a pointer (37) that is maintained so as to point to the first empty pool RCW in the chain (38). In turn, this pool RCW (38) contains a pointer (42) to another pool RCW (43). In the case in which a message is received and a matching HTE is found that points to a PCW, the receive circuit uses the PCW to allocate an empty pool RCW into which the message header is recorded, and to allocate space from the data pool into which the message data is recorded.

Typically software creates a valid HTE with a wildcard SNN and wildcard Tag receive specification for each Comm value in use. These HTEs each contain a pointer to a PCW, and software also creates a chain of empty pool RCWs and a data pool for each PCW so that it may receive messages for which there are no matching posted RCWs. Messages that are received that do not match any other receive requests are then received in a data pool. Software requests to receive a message issued after the message is actually received may then be handled by a data copy operation from a data pool to the application's receive buffer.

Before proceeding further with a description of the transmit and receive circuits, we will describe in detail the format of a message, the format of the data structures that are used to control transmission of messages, and the format of the data structures that are used to post receive requests, these said data structures being located in local memory (4).

Figure 4:
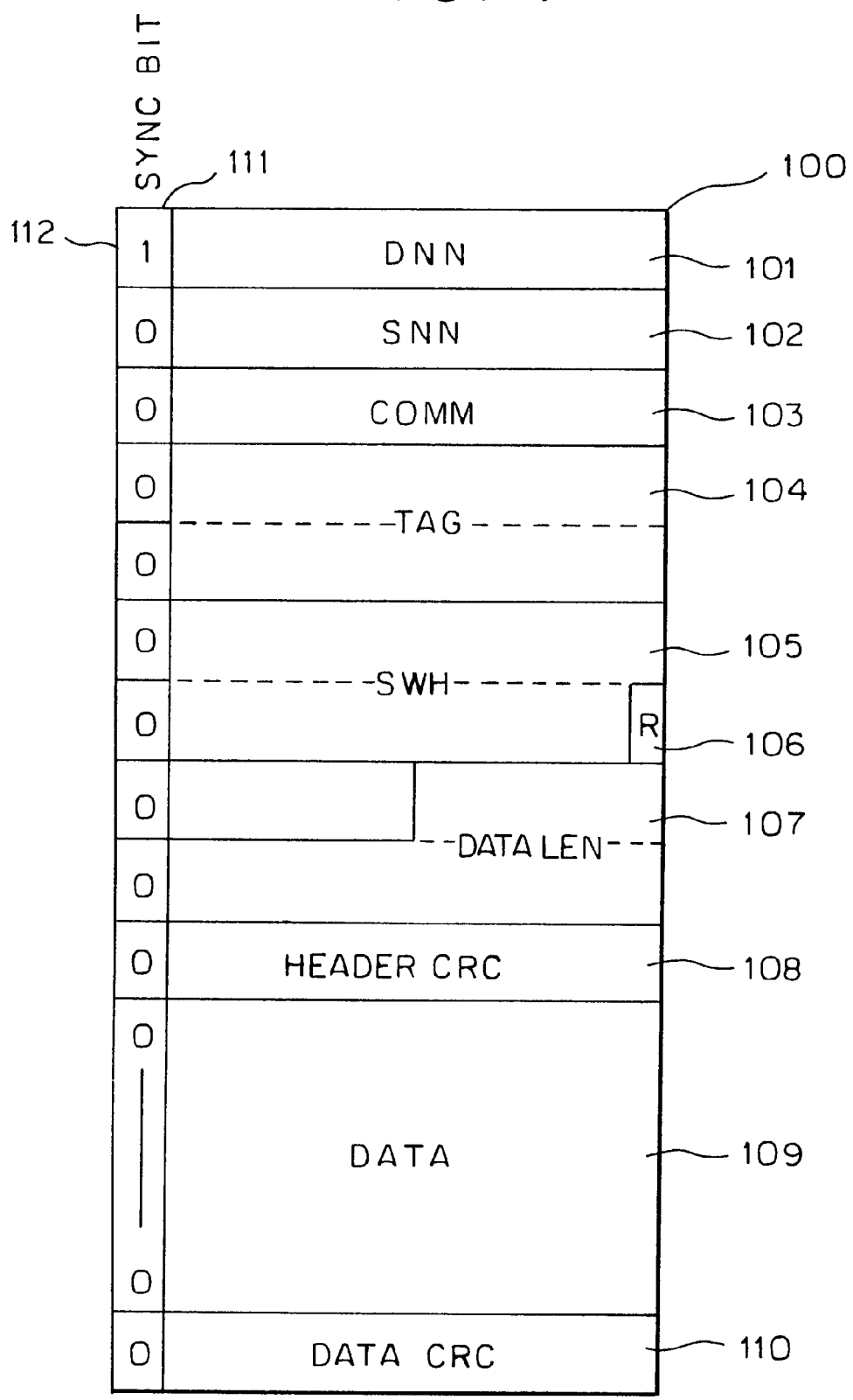
FIG. 4 is a diagram which shows the format of messages transmitted and received by the present invention.

FIG. 4 shows the detailed format of the message (100) used in the present embodiment. The first field is the DNN field (101) that is used by the network (2) to route the message to the correct destination node's receive circuit. It has the same function as that of the destination field of the MPI message envelope. The SNN field (102) identifies to the receiving node the source of the message (100). It has the same function as that of the source field of the MPI message envelope. The Comm field (103) contains a value of similar meaning to the MPI message envelope communicator value that identifies the communication context that the message was sent in and of the communication context of the receive request that is to receive it. The Tag field (104) contains a value of similar meaning to the MPI message envelope tag value as specified by the send request. The software header or SWH field (105) is a field reserved for use by the sending process's library software. The remote interrupt request bit R (106) is a control bit specified by the sending process's library software. When set, this bit specifies that reception of the message (100) by the destination node's receive circuit should cause an IP interrupt request at the receiving node. The data length or DataLenfield (107) specifies the length of the data field (109) of the message (100). The header CRC field (108) is a CRC error check value that is calculated using all of the preceding header fields. The data field (109) contains the message data and the data CRC (110) is a CRC error check value calculated using only the datafield (109). To allow the network and receive circuits to determine which field is the start of a message, a synchronization bit field (111) is appended to every two byte word of the message header and data. Only the synchronization bit (112) accompanying the first two byte word of the message header is set, all of the other synchronization bit fields are clear.

Figure 5:
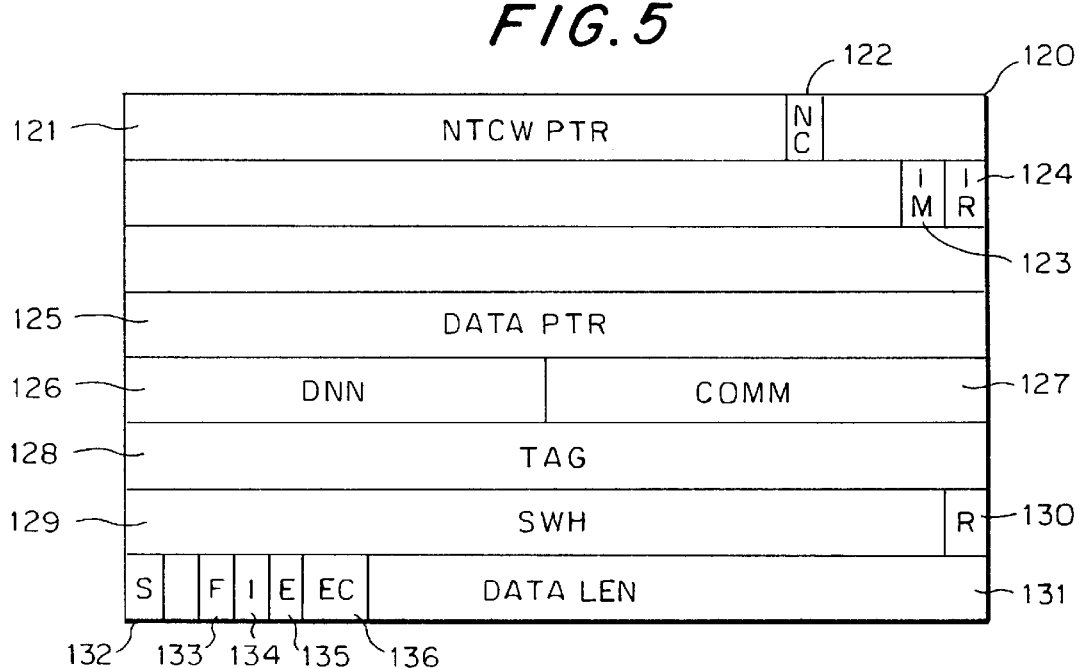
FIG. 5 is a diagram which shows the format of a transmit control word [TCW] that is used by the present invention to request transmission of a message.

A request to transmit a message is stored in local memory in the form of a transmit control word, called a TCW. Multiple messages maybe sent by chaining multiple TCWs together, and the TCWs are processed by the transmit circuit in the same order as they are chained. The detailed format of a TCW (120) is shown in FIG. 5. NTCWPtr (121) is the next pointer chaining field and contains an address pointer to the next chained TCW. NC (122) is the next TCW chained control bit and is set if the NTCWPtr (121) field is valid and points to the next TCW in the TCW chain. The DNN (126), Comm (127), Tag (128), SWH (129), R (130), and DataLen (131) fields contain the respective fields of the message header to be transmitted. The DataPtrfield (125) contains the pointer to the message data to be transmitted. IR (124) is the interrupt request bit, and if set, upon completion of the transmit operation, the transmit circuit will issue an interrupt request. The IM (123) bit controls operation of the interrupt request function. If IM (123) is clear, the IR bit (124) is re-read by the transmit circuit at completion of the transmit operation. If IM (123) is set, the IR bit (124) is not re-read and its value upon the transmit circuit's first read of the TCW is remembered and used to determine whether to cause an interrupt request. The TCW status is made up of the remaining fields S (132), F (133), I (134), E (135) and EC (136). These are written twice by the transmit circuit, first, immediately after the transmit circuit fetches the TCW, and second, when transmission of the message is complete. S (132), the started status bit, is set by the send circuit after the TCW is initially fetched. F (133), the finished status bit, is set by the send circuit when processing of the TCW by the send circuit is finished. I (134), the interrupt request status bit, is set at the same time as F (133), but only if an interrupt request was requested via the IR (124) bit. E (135), the error status bit, is set at the same time as F (133), but only if an error occurred while the sender was processing the TCW. EC (136), the error code field, is written at the same time as E (135) is set and contains a code that can be interpreted by software that describes the error. After the library creates a TCW in local memory, the library either writes the pointer to the TCW to the transmit circuit's NTCWPtr register, to be described later, that is contained within the transmit circuit, or if this register is busy because the transmit circuit is already processing a TCW, the library chains the TCW to the last TCW in the TCW chain. To process a send request, the transmit circuit fetches the TCW, updates status fields within the TCW and performs the transmit request; and, upon the completion of processing of the TCW, the transmit circuit again updates the status bits and fetches the next chained TCW, if any.

Posted receive requests can be divided into two main types: non-persistent receive requests to receive a single message, and persistent requests that may receive any number of messages. Non-persistent receive requests are stored in local memory in the form of posted RCWs and are completed upon reception of the requested message. Persistent receive requests are stored in local memory in the form of a posted PCW. Persistent receive requests to receive any number of messages are stored in memory in the form of posted PCWs, these requests remaining active after reception of a message.

Figure 6:
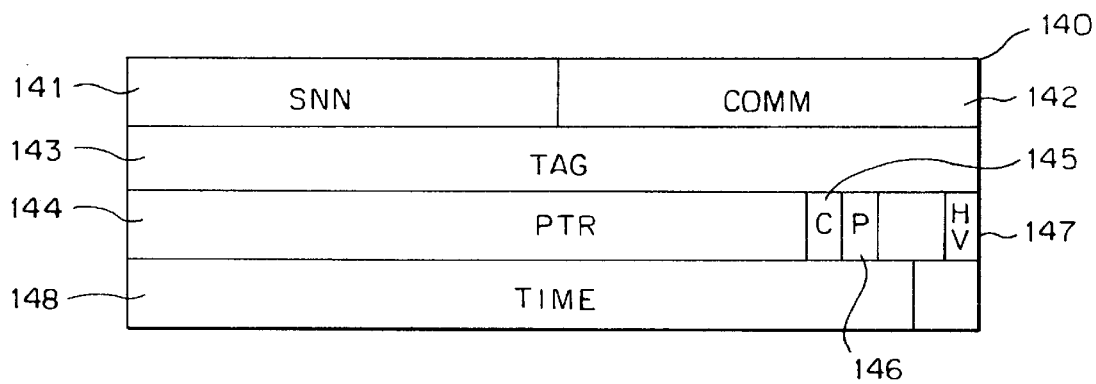
FIG. 6 is a diagram which shows the format of a hash table entry [HTE] that is used by the present invention to post pending receive requests.

Upon message arrival at the receive circuit from the network, the receive circuit searches the receive posting hash table for matching receive requests. FIG. 6 shows the detailed format of a hash table entry, hereinafter called an HTE (140). The SNN (141), Comm (142) and Tag (143) fields together form a message specification of a posted receive request. The SNN field (141) contains either the source node number of the message or a special value with all bits set that represents the wildcard source value. The Comm field (142) contains the communicator value of the receive context, and thus that of the send context of the message, as these must be the same. The Tag field (143) contains either the tag of the message or a special value with all bits set that represents the wildcard tag value. Receive requests in the form of RCWs or PCWs are posted by chaining them from an HTE with a receive specification which is the same as that of the request. The Ptr field (144) contains the chain address pointer to the RCW or PCW. The C bit (145) is a chain valid bit that indicates that the Ptr field (144) is valid. The P bit (146) is set if the Ptr field (144) points directly to a posted PCW and is clear if it points to a posted RCW. HV (147) is the HTE valid field, it is set if the HTE is valid, and is clear if the HTE is invalid. The Time field (148) contains the timestamp value corresponding to the time that the RCW or PCW, as pointed to by the Ptr field (148), was posted.

The location in the receive posting hash table of an HTE with a particular receive specification is determined by a two step process. First, the receive specification is hashed. This involves the use of a hash function, which is a mathematical function that always produces the same result value when for the same input parameters, but whose result value appears to be otherwise random. The values of SNN, Comm and Tag of the receive specification are the input parameters to the hash function, the output value, modulo the number of HTEs in the hash table, gives an index value from the base of the hash table to an initial search point. Second, the HTEs are sequentially searched starting from this initial search point, wrapping around to the base of the hash table upon reaching the hash table's upper limit, until either the HTE is located or an invalid HTE is found, in which case, the HTE is not present in the hash table. If an HTE needs to be created, it should be written over the top of either an old HTE found during the search whose C bit (145) is clear or the first invalid HTE found during the search. Note that this search procedure does not by itself locate HTEs whose receive specifications match a message, but it can be used to locate an HTE with a particular receive specification.

Every non-persistent receive request has a unique timestamp value associated with it. Low values represent older receive requests and higher values represent more recent receive requests. Persistent receive requests also have a timestamp value associated with them, but this should normally be set to the maximum value corresponding to a timestamp value far into the future.

The RCW or PCW corresponding to each receive request to be posted must be chained from the HTE that contains the receive specification of the receive request, creating a new HTE if necessary. There should only be one valid HTE defined in the hash table for a particular receive specification, but it is possible that there are several requests with the same receive specification. In this case the RCWs or PCWs should be chained from each other such that the HTE has a single chain of posted RCWs in order of age with the oldest RCW chained directly from the HTE and the PCW, if any, at the end of the chain. Note that it is neither possible nor meaningful to post more than one RCW with the same receive specification, nor is it possible to chain an RCW following a PCW. Receive requests are satisfied in the order that RCWs and PCWs are chained starting with the oldest first.

There are up to four possible receive specifications that match an incoming message: matching SNN, matching Tag, matching Comm; SNN wildcard, matching Tag, matching Comm; matching SNN, Tag wildcard, matching Comm; or SNN wildcard, Tag wildcard, matching Comm. Upon arrival of a message, the receive circuit attempts to locate all four HTEs containing matching receive specifications. Any number of these four HTEs may be found, but if more than one of the HTEs found has the C bit set indicating a valid Ptr field, the receive circuit uses the Time fields within the matching HTEs to select the HTE with the oldest pending posted receive request. If none of the four HTEs is found, or if they all have the C bit clear, then there is no matching receive request, the receive circuit causes an error and discards the message.

The receive circuit then checks the selected HTE's P bit. If set, the Ptr field points to a posted PCW corresponding to a persistent receive request, or if clear, it points to a posted RCW corresponding to a non-persistent receive request.

The PCW is a data structure in local memory that is used to manage two kinds of receive pool. Firstly, a chain of pool RCWs that are used to record information about messages received when the PCW is accessed by the receive circuit as a posted PCW. Secondly, a data pool, used to record message data that is not received in receive buffers attached to posted RCWs. A single PCW can be posted multiple times using multiple HTEs each with a different receive specification and can thus serve as a default persistent request to receive messages that match no other posted receive requests. A posted RCW that has no attached buffer also links to the PCW to allow message data that matches the posted RCW to be received using the PCW's data pool.

Figure 7:
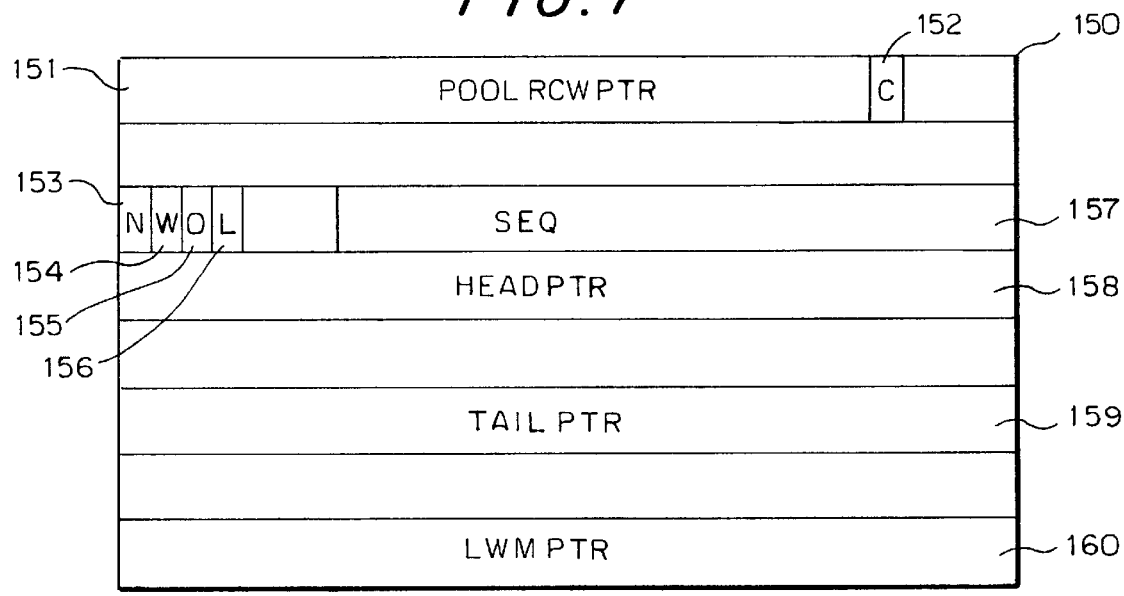
FIG. 7 is a diagram of the format of a pool control word [PCW] that is used by the present invention to manage a data pool and a chain of pool RCWs.

FIG. 7 shows the detailed format of a PCW (150). Pool RCWPtr (151) contains an address pointer to the first pool RCW in a chain of empty pool RCWs. NC (152), if set indicates that the PoolRCWPtr field (151) is valid, or if clear, indicates that the PoolRCWPtr (151) field is invalid and that there are no empty pool RCWs left. N (153) is an error status in which, when set, indicates that an error has occurred because there were no pool RCWs left. W (154) is a warning status bit which, when set, indicates that the chain of pool RCWs is becoming short and should be replenished as soon as possible. O (155) is an error status bit indicating that an error has occurred because there was insufficient data pool space left to record message data. L (156) is a warning status bit indicating that the data pool is running low and should be replenished as soon as possible. Seq (157) is a count that indicates the number of messages that have been received so far using this PCW. HeadPtr (158), TailPtr (159) and LWMPtr (160) are fields containing the head, tail and low water mark address pointers, respectively, that are used to manage the data pool.

Figure 10:
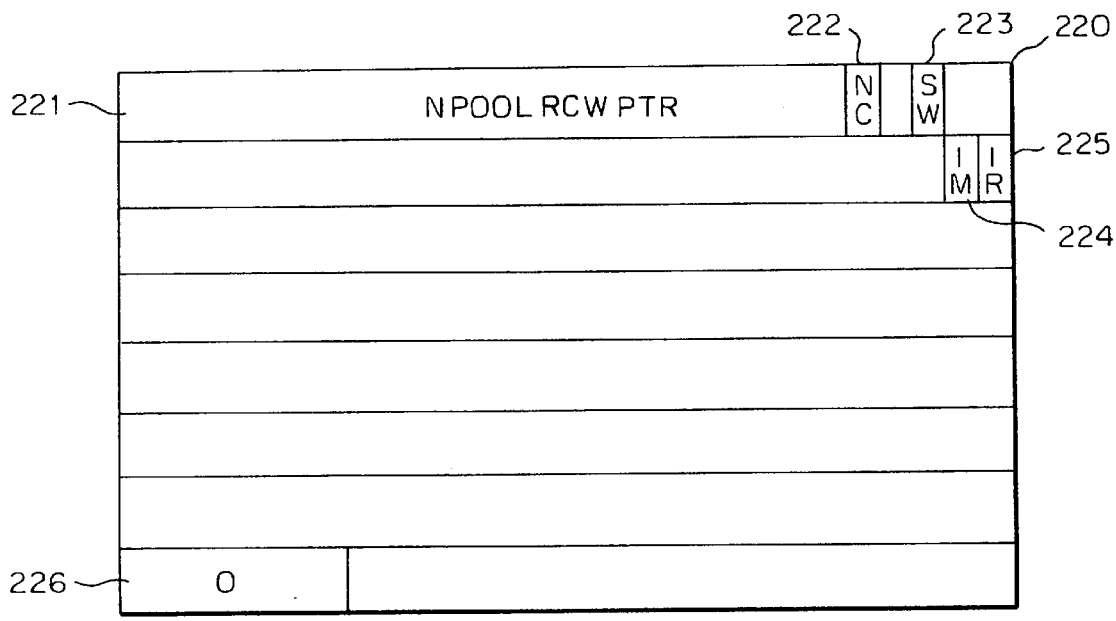
FIG. 10 is a diagram of the format of a pool receive control word [pool RCW] that is used by the present invention to receive a message that does not match any pending posted RCW, which diagram shows the format of the pool RCW before it is updated by the receive circuit due to reception of such a message.

FIG. 10 shows the detailed format of a free pool RCW (220). If the NC bit (222) is set, NPoolRCWPtr (221) contains an address pointer to the next pool RCW in the chain of pool RCWs, or if the NC (222) bit is clear, then this pool RCW is the last pool RCW in the chain. Upon consumption of a pool RCW to receive a message, the NPoolRCWPtr (221) and NC bit (222) fields are copied to the PoolRCWPtr (151) and NC bit (152) fields of the PCW. The SW (223) bit is set by software to indicate that this pool RCW is near the end of the chain and that when this pool RCW is consumed, a warning should occur. IR (225) is the interrupt request bit, and, if set, upon completion of the receive operation, the receive circuit will issue an interrupt request. The IM (224) bit controls operation of the interrupt request function. If IM (224) is clear, the IR bit (225) is re-read by the receive circuit at completion of the receive operation. If IM (224) is set, the IR bit (225) is not re-read and its value upon the receive circuit's first read of the pool RCW is remembered and used to determine whether to cause an interrupt request. The location at which the receive status will be written (226) must be zero initialized.

Figure 11:
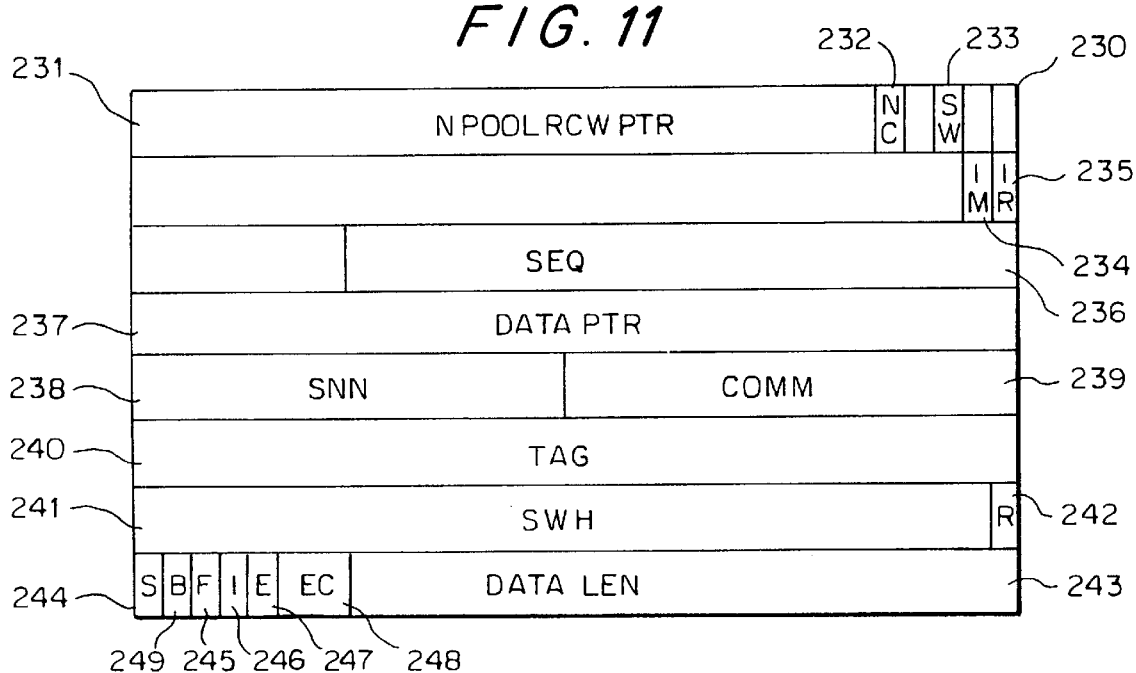
FIG. 11 is a diagram of the format of a pool RCW after the receive circuit has updated it due to reception of a message that does not match any pending posted RCW.

Immediately after the receive circuit fetches a pool RCW, it is updated with information relating to the message being received. The format of the updated pool RCW (230) is shown in FIG. 11. The NPtr (231), NC (232), SW (233), IM (234), and IR (235) fields are not written by the receive circuit. Seq (236) contains the value of the PCWs Seq field (157) when the PCW was fetched DataPtr (237) contains a pointer to the data buffer allocated from the data pool that is used for receiving the message data. SNN (238), Comm (239), Tag (240), SWH (241), R (242), and DataLen (243) contain the corresponding values from the message header. The pool RCW status is made up of the remaining fields S (244), B (249), F (245), I (246), E (247) and EC (248) and these are written twice by the receive circuit, first, immediately after the receive circuit fetches the pool RCW when writing the other fields, and second, when receiving of the message is complete. S (244) is set to indicate that message reception using this pool RCW has started. B (249) is unused and its value is undefined. F (245) is set when message reception using this pool RCW has finished. I (246) indicates that the IR (225) bit was set and that an interrupt request was issued. E (247) is set if an error occurred, in which case EC (248) contains an error code that describes the type of error that occurred.

Figure 12:
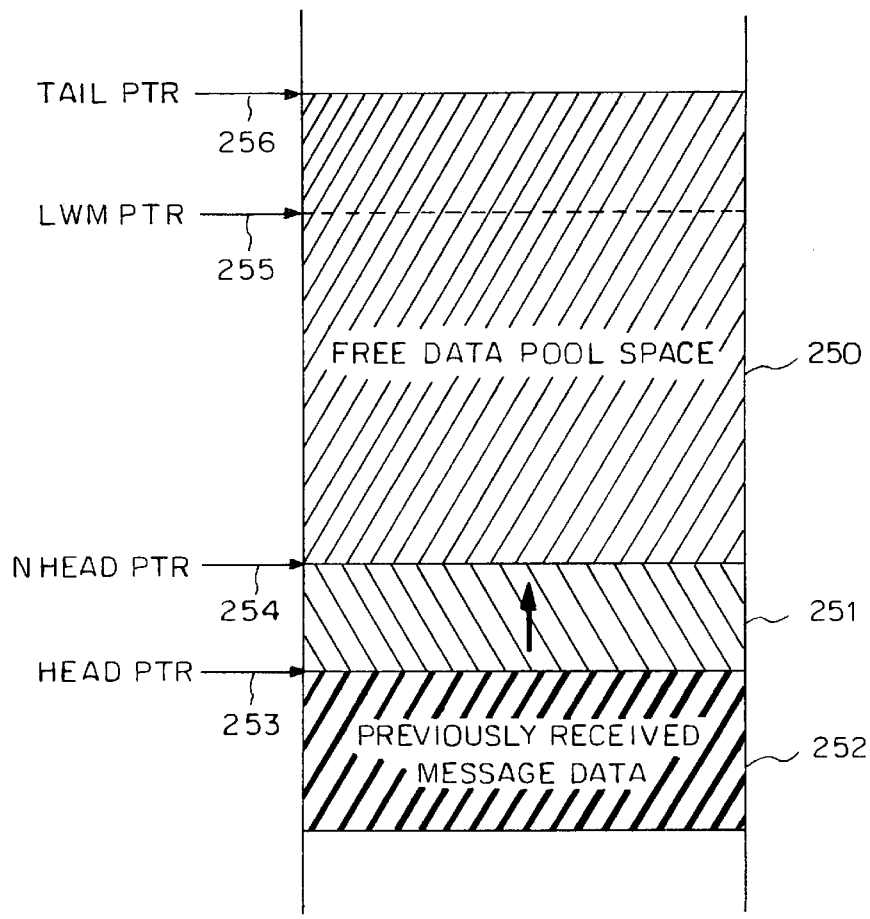
FIG. 12 is a diagram showing the format of a data pool.

FIG. 12 shows the arrangement of a data pool (250). It is a contiguous block of free space in local memory (4) that is used to receive message data. The pointer shown as HeadPtr (253) corresponds to the head pointer of the data pool contained within the PCW's HeadPtr (158) field, and it points to the base address of the block of free space. Contained at locations below this address pointer is previously received message data (252) that has already been received to the data pool. When a receive buffer (251) is allocated from the data pool (250), it is allocated from the base address pointed to by HeadPtr (253), and the head pointer is incremented by the size of the block allocated to give a new head pointer NHeadPtr (254). The pointer shown as TailPtr (256) corresponds to the tail pointer of the pool contained within the PCW's TailPtr (159) field, and it points to the limit of the block of free space. An attempt to allocate a block larger than the size of the data pool corresponds to an attempt to increment NHeadPtr (254) beyond the limit of the data pool pointed to by TailPtr (256), and in this case, an error occurs. The pointer shown as LWMPtr (255) corresponds to the low water mark pointer of the pool contained within the PCW's LWMPtr (160) field, and it points to the low water mark of the block of free space. When NHeadPtr (254) exceeds the low water mark pointer contained within the PCW's LWMPtr (160) field, a warning occurs indicating that the data pool is running low of free space. Typically the PCW's LWMPtr (160) is set sufficiently far below the PCW's TailPtr (159) that, when the warning occurs, the data pool may be replenished before the data pool runs out of free space. After successful allocation of a block of free space from the data pool, the PCW's HeadPtr (158) field is updated with the value of the NHeadPtr (254). Unsuccessful allocation results in the setting of the O bit (155) of the PCW, and exceeding the low water mark results in setting of the L bit (156).

Figure 8:
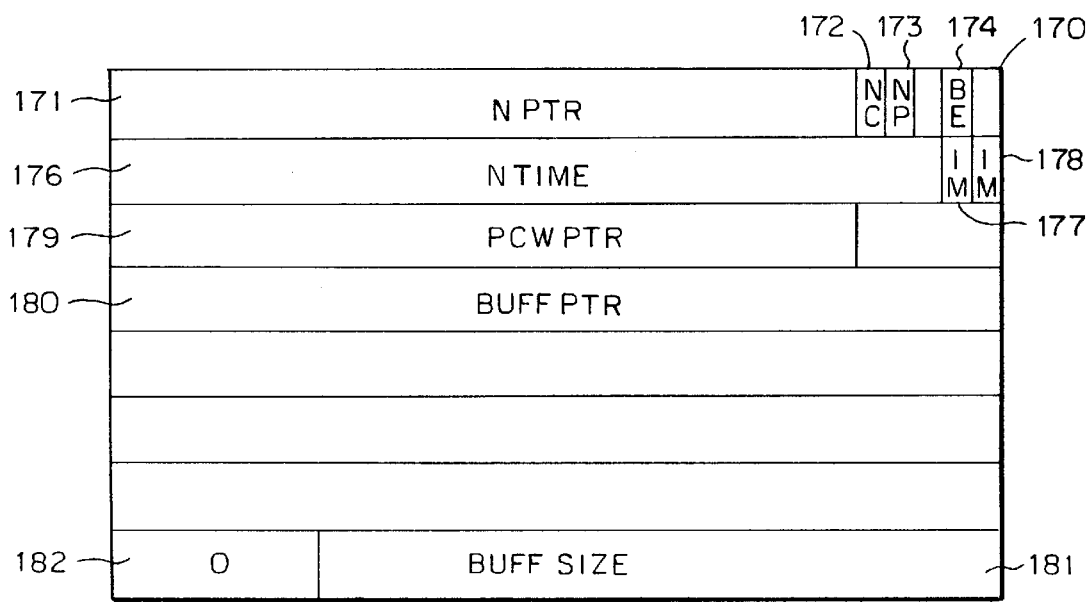
FIG. 8 is a diagram of the format of a posted receive control word [posted RCW] that is used by the present invention to request reception of a message, which diagram shows the format of the posted RCW before it is updated by the receive circuit due to reception of a message that matches the request.

FIG. 8 shows the detailed format of a pending posted RCW (170). The NPtr (171), NP (173) and NTime (176) fields comprise the chaining link to the next oldest posted RCW or PCW that has the same receive specification, these fields being valid only if the NC bit (172) is set. NPtr (171) contains an address pointer to the next oldest posted RCW or PCW chained from the HTE. The NP bit (173), if set, indicates that a posted PCW is next, or if clear, it indicates a posted RCW. The BEbit (174) is the buffer enable bit, and, if set, indicates that the BuffPtr (180) and BuffSize (181) fields are valid and contain the address pointer and size, respectively, of an attached data buffer into which the message data of the requested message is to be received. If the BE bit (175) is clear, the PCWPtr field (179) is valid and contains the address pointer of the PCW whose data pool is to be used to receive the message.

The receive circuit, upon finding a posted RCW, copies the NPtr (171), NC (172), NP (173) and NTime (176) fields to the HTE's Ptr (144), C (145), P (144) and Time (148) fields, respectively, and sets the HV (147) field. This has the effect of unposting the posted RCW from the hash table. If there was another posted RCW or PCW following, the HTE will now point to it, or if there was not, the HTE remains valid but doesn't point to anything. Note that as the hash table search algorithm terminates upon finding an invalid HTE, it is important that the HTE is not invalidated, as this may prevent other HTEs from being found upon a search for a different HTE. IR (178) is the interrupt request bit, and, if set, the receive circuit, upon completion of the receive operation, will issue an interrupt request. The IM (177) bit controls operation of the interrupt request function. If IM (177) is clear, the IR bit (178) is re-read by the receive circuit at completion of the receive operation. If IM (177) is set, the IR bit (178) is not re-read and its value upon the receive circuit's first read of the RCW is remembered and used to determine whether to cause an interrupt request. The location at which the receive status will be written (182) must be zero initialized.

Figure 9:
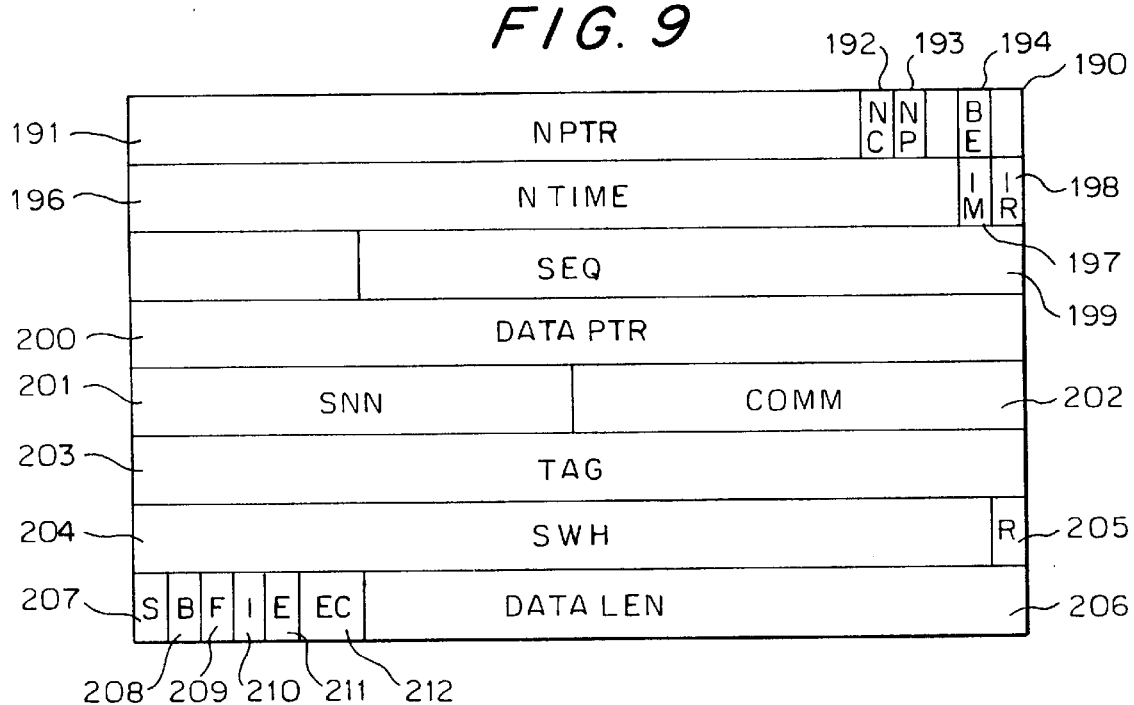
FIG. 9 is a diagram showing the format of the posted RCW after the receive circuit has updated it.

Immediately after the receive circuit fetches a posted RCW, it is updated with information relating to the message being received. The format of the updated posted RCW (190) is shown in FIG. 9. The NPtr (191), NC (192), NP (193), BE (194), NTime (196), IM (197), and IR (198) fields are not written by the receive circuit. If the BE bit (174) was set then neither the Seq (199) nor the DataPtr (200) fields are written, and the PCWPtr (179) and BuffPtr (180) fields remain as set by software. If the BE bit (174) was clear, the Seq (199) field is written and contains the value of the Seq field (157) of the PCW when the PCW was fetched by the receive circuit, and the DataPtr (200) field is written with the base address of the data buffer allocated from the data pool that is to be used for receiving the message data. The SNN (201), Comm (202), Tag (203), SWH (204), R (205), and DataLen (206) fields contain the corresponding values from the message header. The remaining fields S (207), B (208) F (209), I (210), E (211) and EC (212) are written twice by the receive circuit, first, immediately after the receive circuit fetches the posted RCW when writing the other fields, and second, when receipt of the message is complete. S (207) is set to indicate that message reception using this posted RCW has started. B (208) is set if the buffer was enabled via the BE bit (194) at the time that the receive circuit fetched the posted RCW. F (209) is set when message reception using this posted RCW has finished. I (210) indicates that the IR (178) bit was set and that an interrupt request was issued. E (211) is set if an error occurred, in which case EC (212) contains an error code that describes the type of error that occurred.

Figure 13:
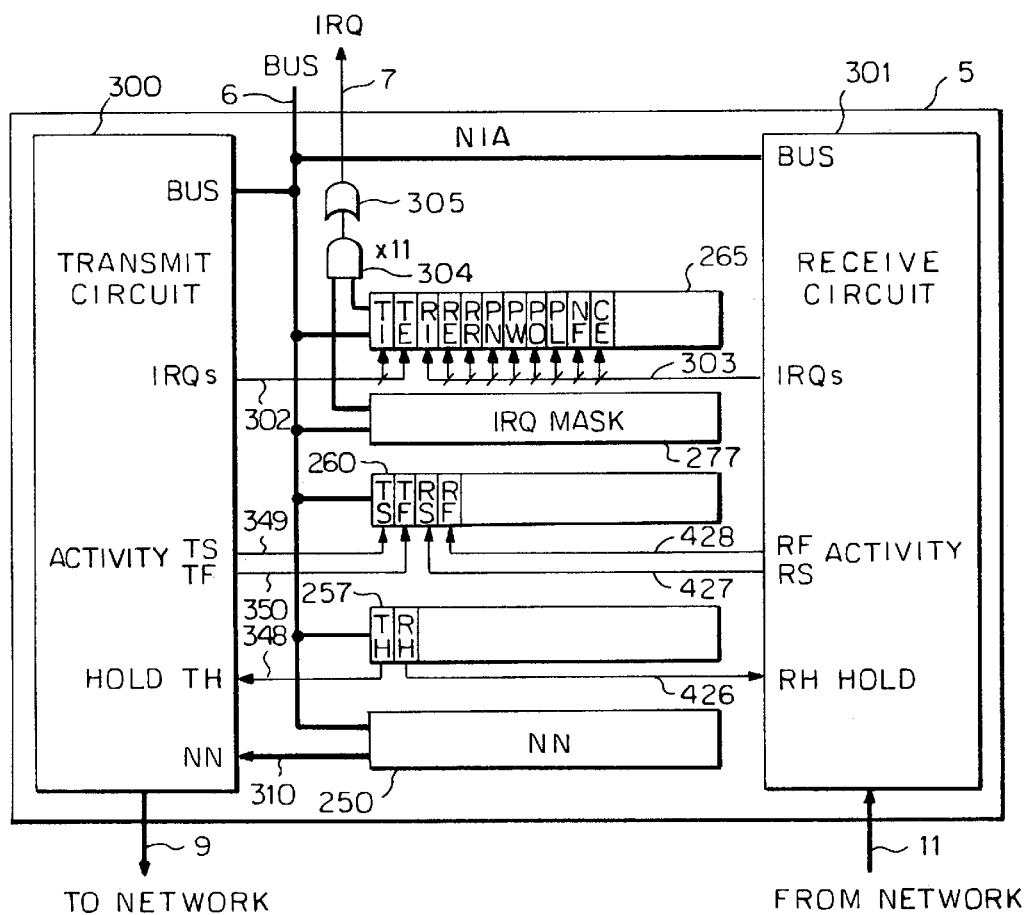
FIG. 13 is a circuit diagram of a network interface adapter [NIA]

The description of the present embodiment now moves on to the circuits contained within the NIA. FIG. 13 shows a more detailed diagram of the NIA (5). It contains a transmit circuit (300) and a receive circuit (301) and other circuits shared by the transmit and receive circuits, including an interrupt request status register (265), an interrupt request mask register (277), an interrupt request circuit (304 & 305), an activity status register (260), a hold control register (257), and a node number configuration register (250).

Figure 16:
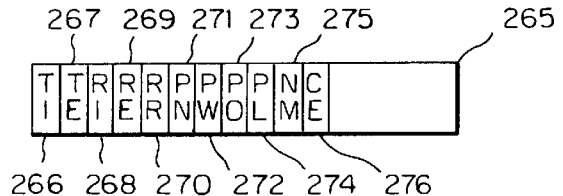
FIG. 16 is a diagram of the format of the NIA interrupt request status register.

Interrupt request signals (302) from the transmit circuit (300) and interrupt request signals (303) from the receive circuit (301) set interrupt status bits in the interrupt status register (265). Each interrupt status bit is logically ANDed with the corresponding interrupt mask bit within the interrupt mask register (277) by the AND gates marked (304). The outputs from these AND gates (304) are all logically ORed together by the OR gate marked (305) to produce the IP interrupt request signal (7) which goes to the IP (3). The IP (3) may interrogate or clear any of the interrupt request status bits via the bus (6) and may also program the interrupt request mask bits via the bus (6). The format of the interrupt request status register (265) is shown in FIG. 16. and is described below. The format of the interrupt request mask register (277) is similar to the interrupt request status register (265), but each bit of the interrupt mask register (277) is the interrupt request mask bit corresponding to the interrupt request status bit of the same bit position in the interrupt request status register (265). Using this interrupt circuit, the transmit circuit (300) or the receive circuit (301) may issue interrupt requests to the IP (3).

The detailed format of the interrupt request status register (265) is shown in FIG. 16 and the meaning of each of the interrupt request status bits is as follows. TI (266) is the transmit interrupt request status bit which is set when the transmit circuit completes processing of a TCW that has the IR (124) bit set. TE (267) is the transmit error interrupt status which is set when the transmit circuit sets a TCW's E bit (135) indicating that an error has occurred. RI (268) is the receive interrupt request status which is set when the receive circuit completes processing of a posted RCW that has the IR bit (178) set or a pool RCW that has the IR bit (225) set. RE (269) is the receive error interrupt status which is set when the receive circuit sets a posted RCW's E bit (211) or a pool RCW's E bit (247) indicating that an error has occurred. RR (270) is the remote interrupt request status that is set by the receive circuit when it sets either a posted RCW's F bit (209) or a pool RCW's F bit (245), but only if the message received had the R bit (106) set. PN (271), PW (272), PO (273), PL (274) are PCW interrupt request status bits and are set by the receive circuit if it sets a PCW's N (153), W (154), O (155) or L (156) bit respectively. NM (275) is the no match found error interrupt status bit that is set by the receive circuit if it could locate neither a posted RCW nor a posted PCW. CE (276) is the header CRC error bit that is set by the receive circuit if a message header had an incorrect header CRC, in which case the message is discarded.

The node number register (250) is used to hold the unique node number assigned to the node. It may be programmed by the IP (3) via the bus (6). Typically it is only written by the IP during system initialization. The output (310) from the node number register (250) goes to the transmit circuit (300) which uses it to place the SNN field (102) in each message sent from the node.

Figure 14:
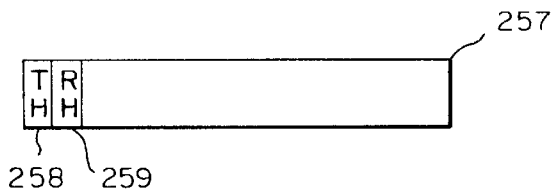
FIG. 14 is a diagram of the format of the NIA hold control register.
Figure 15:
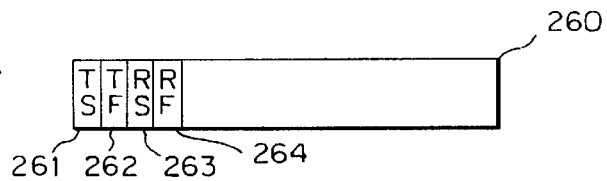
FIG. 15 is a diagram of the format of the NIA activity status register.

The hold control register (257) may be programmed by the IP (3) via the bus (6). This register, whose format is shown in FIG. 14, contains two control bits: the transmit hold or TH bit (258), and the receive hold or RH bit (259). The activity status register (260), shown in FIG. 15, may be read by the IP (3) via the bus (6). It contains four status bits: TS, the transmit starling activity bit (261); TF, the transmit finishing activity bit (262); RS, the receive starting activity bit (263); and RF, the receive finishing activity bit (264). Together these registers provide a locking mechanism for access to the data structures with shared access by the NIA and by the software library.

The output (348) of the TH bit is connected to the transmit circuit (300). It is used to temporarily hold the transmit circuit such that it will hold off from starting to process the next send request. The TS activity signal (349) from the transmit circuit (300) is connected to the TS activity bit (261) and the TF activity signal (350) from the transmit circuit (300) is connected to the TF activity bit (262) and they reflect the current state of the transmit circuit's sequencer. The output (426) of the RH bit is connected to the receive circuit (301). It is used to temporarily hold the receive circuit such that it will hold off from starting to receive another message, without dropping any messages. The RS activity signal (427) from the receive circuit (301) is connected to the RS activity bit (263) and the RF activity signal (428) from the receive circuit (301) is connected to the RF activity bit (264) and they reflect the current state of the receive circuit's sequencer.

Figure 17:
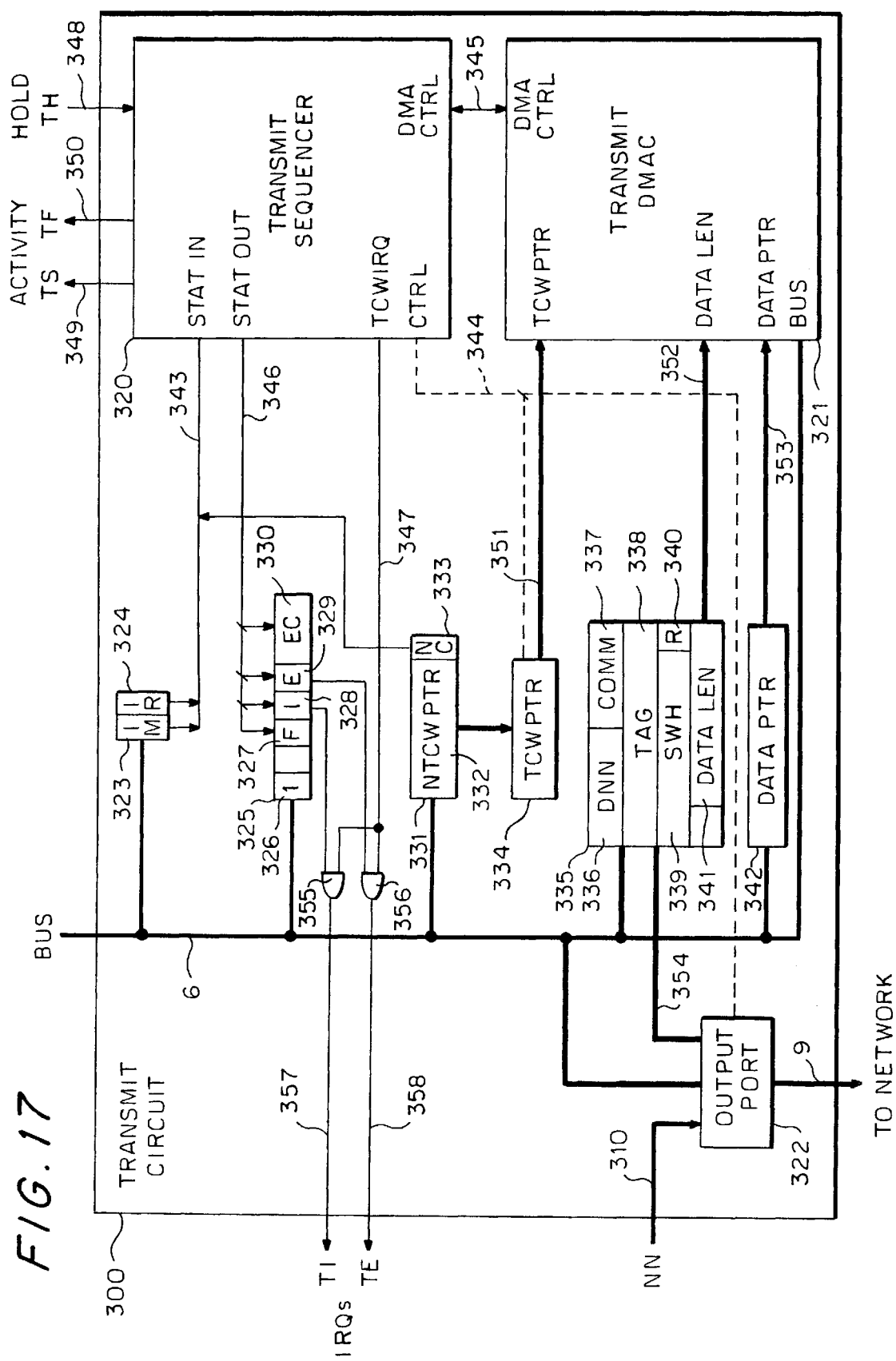
FIG. 17 is a circuit diagram of the transmit circuit.

FIG. 17 shows a more detailed diagram of the transmit circuit (300). It will be described with reference to FIG. 18 which shows the flow of its operation. A transmit sequencer (320) is responsible for overall control of the transmit circuit, its operation can be held via the TH hold signal (348) from the TH hold control bit (258). The status of the sequencer is reflected in the NIA activity status register (260) via the TS (349) and TF (350) signals connected to the TS (261) and TF (262) activity status bits. The transmit sequencer (320) controls a direct memory access controller, DMAC (321), via DMA control signals (345) between the transmit sequencer (320) and the DMAC (321). The DMAC (321) can control operation of the bus (6) to allow the transmit circuit to fetch and update TCWs in local memory and can control fetching of message data from local memory. The transmit sequencer controls a network output port (322) via other miscellaneous control signals (344). The network output port (322) has connections from the output (354) of the transmit header buffer registers (335) and connections from the node number register (310) to allow it to create message headers. It also has a connection to the bus (6) to receive message data from the bus as it is fetched from local memory to form data fields of messages. The network output port (322) also calculates the header and data CRC fields of each message and transmits assembled messages to the network via the transmit circuit's network connection (9). The TCW chaining buffer (331) contains the NTCWPtr register (332) and the NC bit (333), and is used to hold chaining information about the next TCW to be processed. This register is also accessible by the IP via the bus (6). When the transmit sequencer (320) starts to process the next TCW, it asserts one of the miscellaneous control signals (344) to latch a copy of the NTCWPtr register (332) to the TCWPtr register (334). The TCWPtr register (334) contains the address pointer to the currently processed TCW. Its output (351) is used as the address pointer to the TCW by the DMAC (321) when accessing the current TCW. A TCW is fetched from local memory (4) via the bus (6) and its contents are placed in registers within the transmit circuit. The TCW's NTCWPtr (121) and NC bit (122) fields are placed in the NTCWPtr register (332) and NC bit register (333), respectively. The TCW's IM (123) and IR (124) bit fields are placed in the IM (323) and IR (324) bit registers, respectively, and the outputs of these bits together with the output of the NC bit register (333) make up the status input signals (343) to the transmit sequencer (320). The DataPtr register (342) is used to hold the DataPtr field (125) from the TCW. The header buffer registers (335) which include the DNN register (336), the Comm register (337), the Tag register (338), the SWH register (339), the R bit register (340) and the DataLen register (341) are used to hold the TCW's DNN (126), Comm (127), Tag (128), SWH (129), R bit (130) and DataLen (131) fields, respectively. The DataPtr register (342) and the DataLen register (341) also have output connections (353) and (352), respectively, to the DMAC (321) used when the DMAC is requested by the transmit sequencer to fetch message data. Immediately after a TCW is fetched and again when processing of the TCW is completed, the transmit circuit updates the TCW's status fields. The transmit circuit contains a transmit status buffer (325) which is used to buffer status outputs (346) from the transmit sequencer (320) before they are written back to the TCW status fields. When the transmit status register is written to the TCW, the S (326), F (327), I (328), E (329) and EC (330) fields of the transmit status register are written to the S (132), F (133), S (134), E (135) and EC (136) fields of the TCW, respectively.

Figure 18:
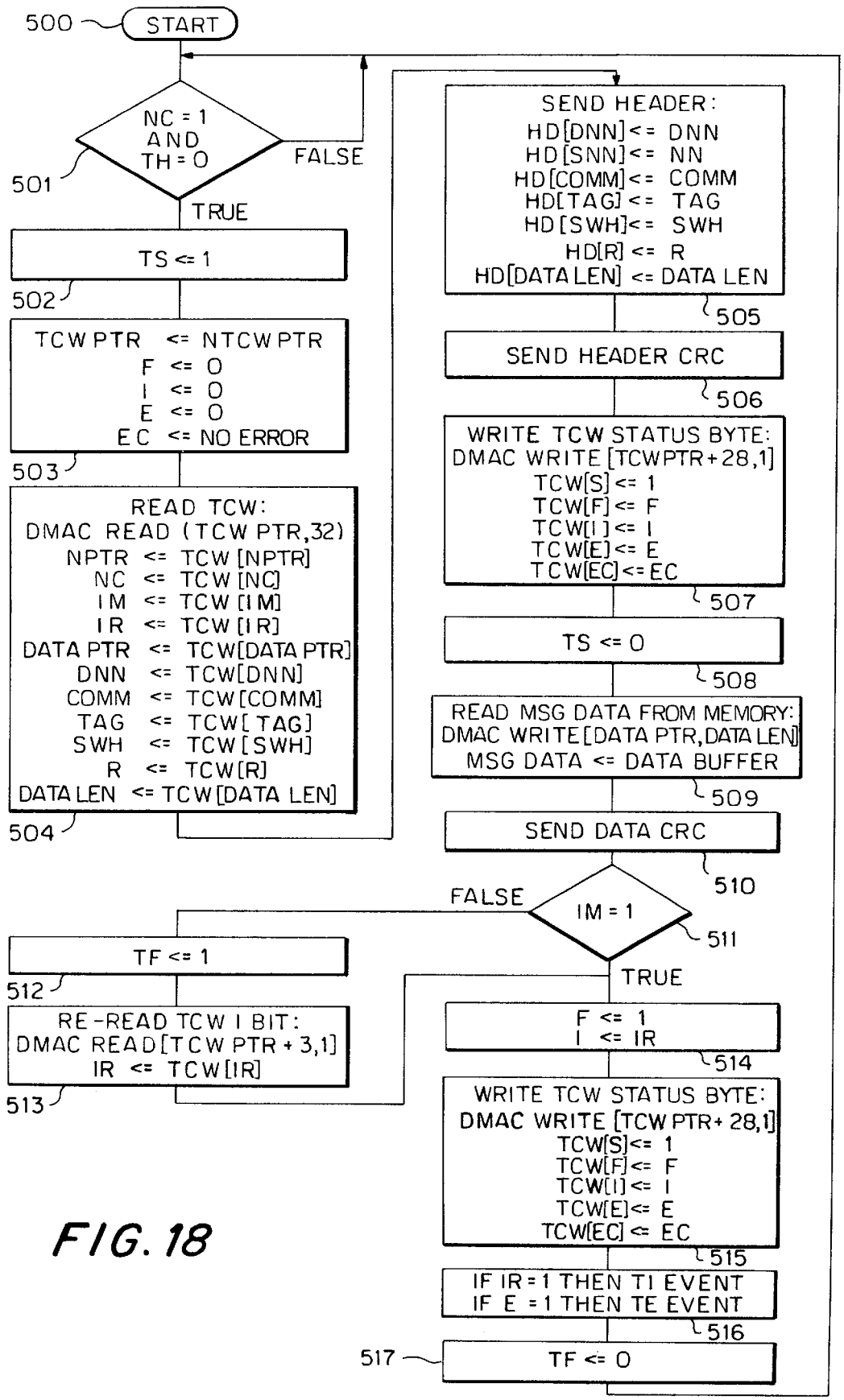
FIG. 18 is a flow chart describing the operation of the transmit circuit.

The flow of operation of the transmit circuit is shown in FIG. 18. Upon power-on, all registers and statuses within the NIA are cleared and the transmit sequencer (320) commences operation from the start (500). At step (501) it waits until the TH hold control bit (258) is clear, indicating that the software library is not attempting to hold the transmit circuit from starting to process a TCW, and the NC bit (333) is set indicating that the NTCWPtr register (332) contains the address of the next TCW to be processed. At step (502), the TS status bit (261) is set to indicate that the transmit circuit is starting to process a TCW. Then, at step (503) the TCWPtr register (334) is loaded with the address of the next TCW from the NTCWPtr register (332), and the F (327), I (328), E (329) and EC (330) registers are cleared to their initial condition and indicate that no error has yet occurred. At step (504) the transmit sequencer (320) requests the transmit circuit's DMAC (321) to fetch the TCW from memory using the TCW address pointer in the TCWPtr register (334). When the TCW's contents are returned from local memory, they are stored in the transmit circuits registers as follows: the NTCWPtr (121), and NC (122) fields are stored in the NTCWPtr (332) and NC (333) registers; the IM (123) and IR (124) fields are stored in the IM (323) and IR (324) bit registers; the DataPtr field (125) is stored in the DataPtr register (342); and the DNN (126), Comm (127), Tag (128), SWH (129), R (130) and DataLen (131) fields are stored in the DNN (336), Comm (337), Tag (338), SWH (339), R (340) and DataLen (341) registers of the TCW buffer (335), respectively. At step (505) the transmit sequencer (320) commands the network output port (322) to start sending the message, at which point it fetches and transmits, in order, the contents of the DNN register (336), the NN register (250), the Comm (337), Tag (338), SWH (339), R (340) and DataLen (341) registers to form the DNN (101), SNN (102), Comm (103), Tag (104), SWH (105), R (106), and DataLen (107) message header fields, respectively. At step (506), the network output port (322) then transmits the header CRC field (108) calculated from the preceding header fields. At step (507), the transmit sequencer (320) then requests the DMAC (321) to write the TCW status buffer's S (326), F (327), I 329), E (329) and EC (330) registers to the S, F, I, E and EC fields in the TCW, respectively. When the write operation has been completed at step (508), the TS activity status bit is cleared. At step (509), the transmit sequencer (320) requests the DMAC (321) to fetch the message data from local memory, the address and length of the data being contained within the DataPtr (342) and DataLen (341) registers, respectively. As the data is returned from local memory via the bus (6), the network output port (322) transmits the data to the network to form the data field (109) of the message. Once all of the data has been transmitted, at step (510), it appends the DataCRC field (110) to the end of the message. At step (511) the transmit sequencer tests the value of the IM register bit (323). If it is clear, the transmit sequencer (320), at step (512), sets the TF activity status bit (262) and, at step (513), requests the DMAC (321) to refetch the IR bit field (124) from the TCW to the IR bit register (324). After the IR bit has been refetched, or if the re-fetch was not required, the transmit sequencer goes on to step (514). The transmit sequencer sets F (327) and sets I (328) to the value of IR (324). If an error occurred during processing of the TCW, the EC register (330) is set to contain a value representing the error code, and the E bit (329) is set. At step (515) the transmit sequencer (320) then requests the DMAC (321) to again write the S, F, I, E and EC registers of the TCW status buffer (325) to the S, F, I, E and EC fields of the TCW, respectively. After the write request is completed at step (516), the transmit sequencer (320) asserts the TCWIRQ signal (347) which is ANDed with the I (328) and E (329) bits of the TCW status buffer (325) by two AND gates (355) and (356) respectively. These two AND gates (355) and (356) have outputs (357) and (358) connected to the TI (266) and TE (267) interrupt request status bits. Thus, if an interrupt was requested by the setting of the IR bit field (124) in the TCW, the TI interrupt status bit (266) will be set. If this interrupt was not masked by the interrupt mask register (277), the interrupt request line (7) to the processor will also be asserted. Similarly, if an error had occurred, the E bit of the TCW status buffer was set and, if this interrupt was not masked by the interrupt mask register, the interrupt request line to the processor will also be asserted. At step (517) the sequencer clears the TF activity status bit (262) and goes back to step (501) and is ready to process the next TCW.

Application software issues a request to transmit a message or messages by calling the send library software sub-routine. The library software creates a TCW for each message to be transmitted and chains them together to form a sub-chain. If the transmit circuit is already processing a chain of TCWs, the new TCW sub-chain is chained on to the end of the existing chain. If the transmit circuit is processing the last TCW in a chain or is idle, then the library software programs the transmit circuit to start processing the new chain of TCWs. As the transmit circuit always processes TCWs and transmits messages in the same order as they appear in the TCW chain, this method of queuing transmit commands ensures that messages are transmitted in the same order as the send request issue order. As the network routes messages in a non-overtaking manner, messages transmitted from a transmit circuit to a receive circuit arrive in the same order as the order the send requests were issued.

Figure 19:
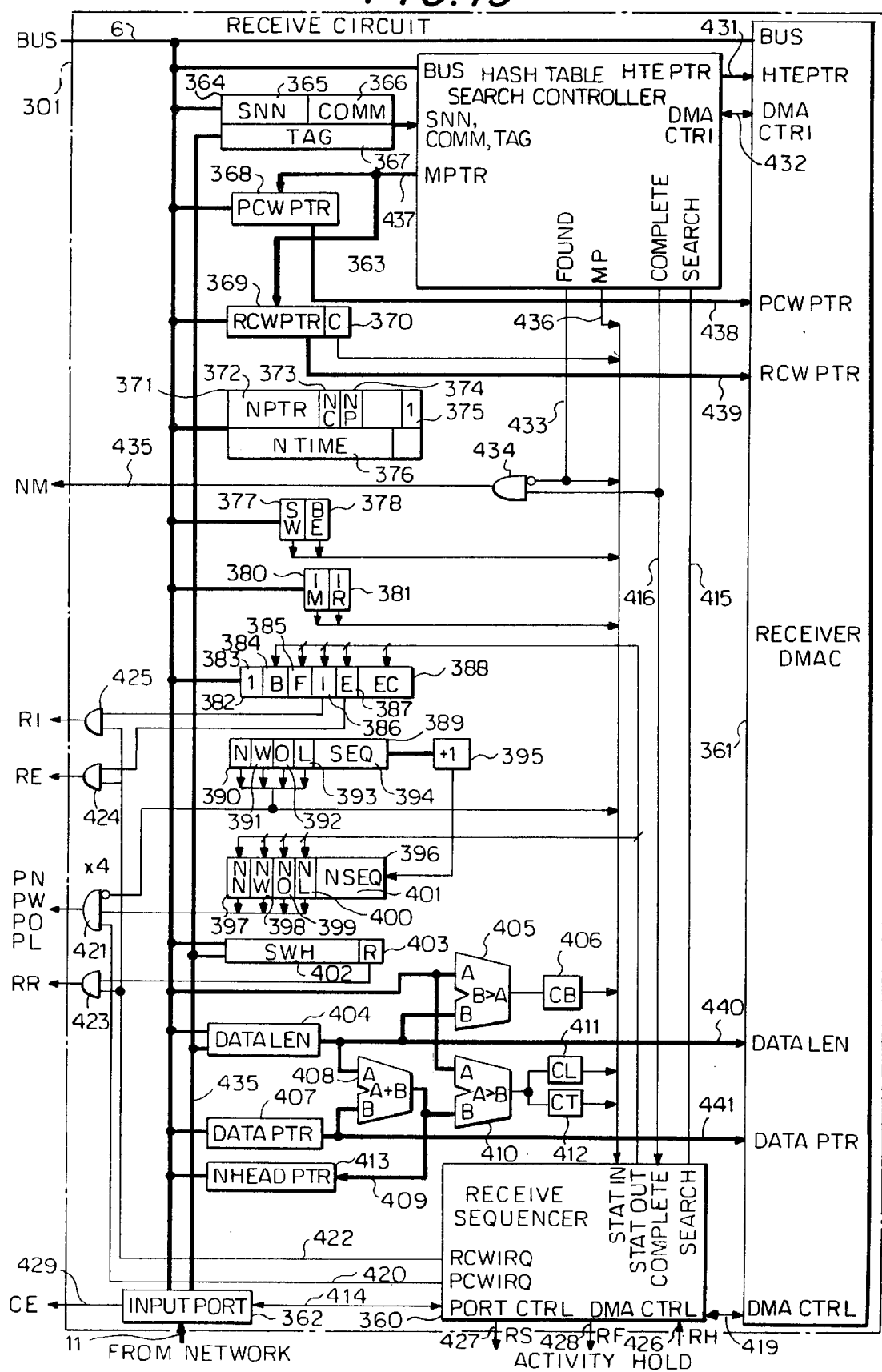
FIG. 19 is a circuit diagram of the receive circuit.
Figure 21:
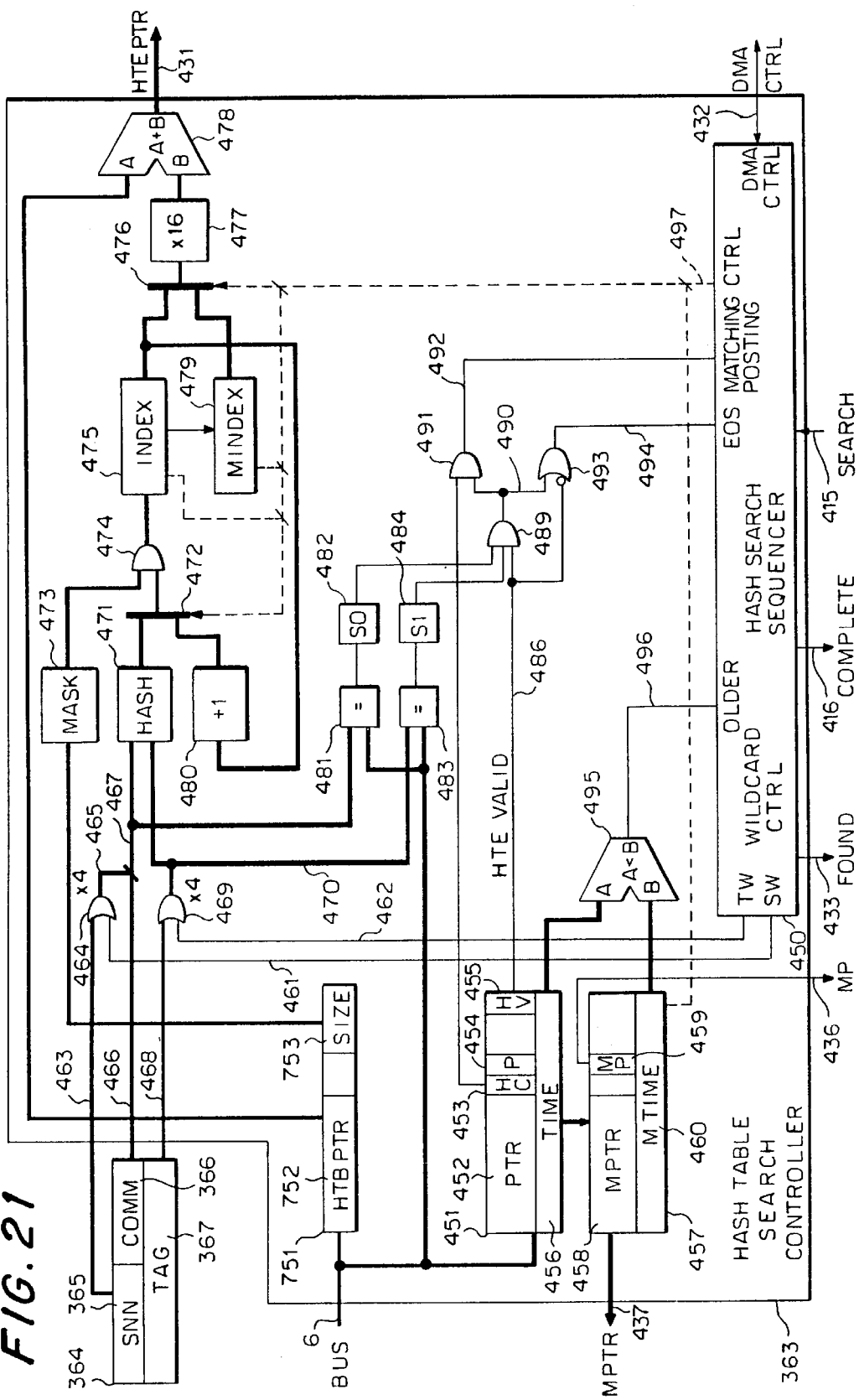
FIG. 21 is a circuit diagram of the hash table search controller.
Figure 22:
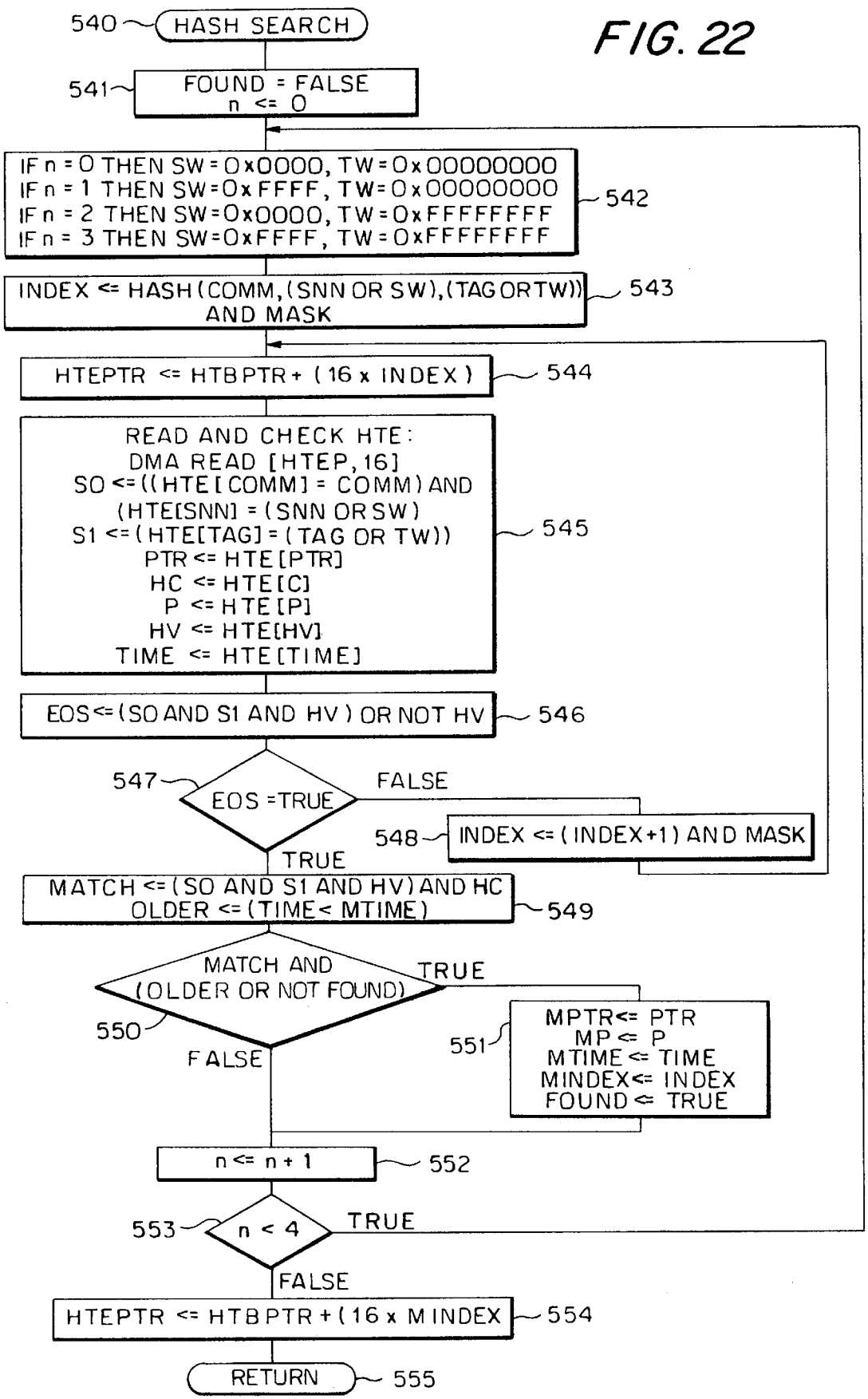
FIG. 22 is a flow chart describing the operation of the hash table search controller.

FIG. 19 shows a more detailed diagram of the receiver circuit (301). It will be described with reference to FIGS. 20, 23, 24, 25 and 26 that together show the flow of its operation, and also with reference to the hash search controller circuit that is contained within the receiver circuit. FIG. 21 shows the detailed circuit diagram of the hash table search controller circuit (363) which will be described with reference to FIG. 22, which is the flow diagram of its operation.

We start our description of the receive circuit with reference to FIG. 19. A receive sequencer (360) is responsible for overall control of the receive circuit. A receiver DMAC (361) can control operation of the bus (6) to allow the receive circuit to fetch and update HTEs, posted RCWs, PCWs, and pool RCWs in local memory and can control writing of message data to local memory. The receive sequencer (360) controls an input port (362) which has a network connection (11) though which it receives messages. A hash table search controller (363) is responsible for locating the HTE in the hash table that points to the oldest posted RCW or PCW that also contains a matching receive specification. Also contained within the receive circuit are numerous other registers, arithmetic units and gates that will be described later.

Figure 20:
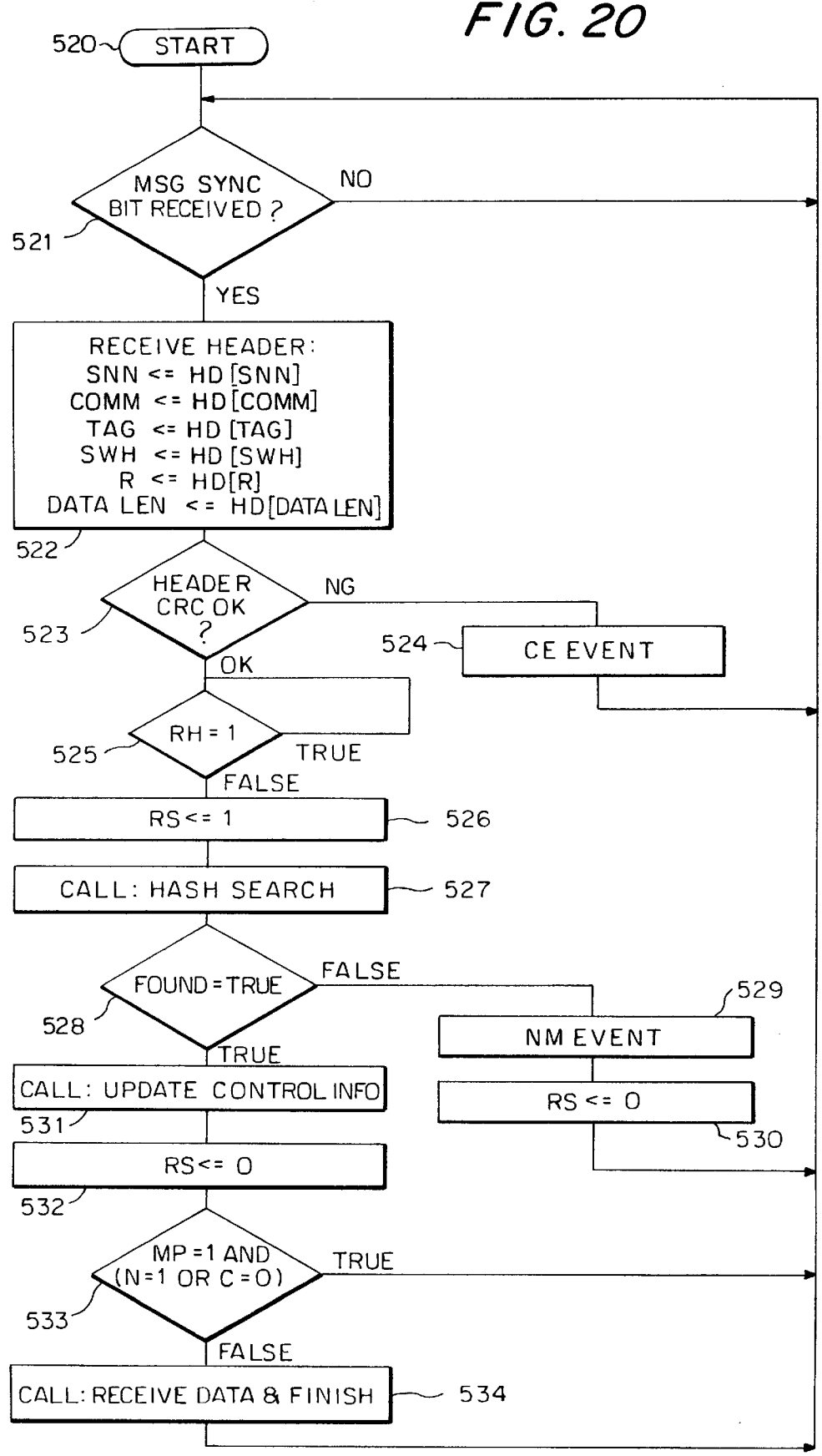
FIG. 20 is a flow chart describing the overall operation of the receive circuit.

The main flow of operation of the receive circuit is shown in FIG. 20. Upon power on, all registers and statuses within the NIA are initialized and operation commences from step (520). At step (521), the input port (362) waits until it starts to receive a message header via its receive network connection (11). The input port (362) identifies the start of a message header by the message synchronization bit (112). At step (522), the input port (362) moves the SNN (102), Comm (103), Tag (104), SWH (105), R (106) and DataLen (107) fields from the message header to the SNN (365), Comm (366), Tag (367), SWH (402), R (403) and DataLen (404) registers, respectively, using the message header data bus (435) that is connected to these registers. At step (523), the input port (362) checks the status of the HeaderCRC field (108) of the message header. If it is in error, the CE interrupt status bit (276) is set via the header CRC error signal (429)

at step (524) to inform software of the message header CRC error. After reporting the error, flow returns to the beginning at step (521), and the input port (362) waits to receive the start of the next message header. If no error was detected at step (523), the input port (362) informs the receive sequencer (360), via the input port control signals (414), of the arrival of a valid message header.

The status of the receiver hold control bit (259) is forwarded to the receive sequencer via the receiver hold control signal (426), and at step (525), the receive sequencer (360) waits for this bit to be cleared. If this bit is already clear or upon the bit being cleared, the receive sequencer (360) sets the starting receive activity status bit (263) at step (526), by asserting the starting receive activity signal (427).

It is important that software and the receive circuit do not simultaneously access and modify the control structures that are used to maintain posted receive requests as this may lead to incoherent operation. The starting receive activity status bit (263) and receiver hold control bit (259), which software can access via the bus (6), can be used to avoid this problem. The starting receive activity status bit (263) is set by the receive sequencer just before the receive circuit starts to access the control structures used to post receive requests, and is cleared by the receive circuit upon completion of any modifications to these structures to unpost a posted RCW, to allocate a pool RCW, or to allocate data pool space, as may be required for reception of the message. The receiver hold control bit (259) allows software to temporarily hold the operation of the receiver so that it does not start to process a message and thus prevents access by the receive circuit to the control structures. The receive circuit never sets the starting receive activity status bit (263) if the receive hold control bit (259) is set, and clears the starting receive activity status bit (263) as soon as possible after setting it, but only after completing the required accesses to the control structures. Thus, if software sets the receiver hold control bit (259) and then waits for the starting receive activity status bit (263) to clear, the software can be sure that the receive circuit will not access the control structures again until the receive hold control bit (259) is cleared. Using the receive hold control bit (259) and the starting receive activity status bit (263) in this way, the software may ensure exclusive access to these control structures or modify them without leading to incoherent operation of the receive circuit.

Upon setting the starting receive activity status bit (263) at step (526), the receive sequencer moves on to step (527) where it asserts the search request signal (415) that goes to the hash table search controller (363). The hash table search controller (363) uses the values within the SNN (365), Comm (366) and Tag (367) registers of the message header parameter buffer (364) as input parameters for its search. The hash table search controller (363) and its operation will be described before ore resuming with the description of the rest of the receive circuit.

FIG. 21 shows the detailed circuit diagram of the hash table search controller (363). This circuit is responsible for locating the HTE that points to the oldest posted RCW or PCW that also contains a matching receive specification. The hash table search controller circuit diagram in FIG. 21 will be described with reference to FIG. 22, which is a flow diagram of its operation.

To perform its task, the hash table search controller (363) searches for each HTE that has a receive specification that could possibly match the contents of the message header parameter buffer (364), and maintains information about the matching HTE with the oldest posting found so far. The matched HTE buffer (457) which has MPtr (458), MP (459) and MTime (460) registers, contains the Ptr (144), P (146) and Time (148) fields of the matched HTE with the oldest posting found so far, and the index of this HTE is held in the MIndex register (479). These registers are signaled as being valid by the Found signal (433).

A hash table configuration register (251) contains HTBPtr (252) and Size (253) registers and is programmable by software running on the IP (3) via the bus (6). The HTBPtr register (252) specifies the base address of the hash table, and the Size register (253) specifies the number of HTEs in the hash table. For simplicity, in the present embodiment, the number of HTEs in the hash table is limited to being a power of two.

Upon arrival of a message and the loading of the message header parameter buffer (364), the hash table search sequencer (450) is started, at step (540), via the search request signal (415). The hash search sequencer (450) is responsible for controlling, via control signals (497), the operation of the selectors and latches within the hash search controller and for requesting HTE fetches via DMA control signals (432) to the receiver DMAC (361). There are four possible receive specifications that can match a message, and these correspond to each of the four possible combinations of wildcard usage. The hash search sequencer (450) performs a separate search for each HTE corresponding to these four combinations, and for this purpose, maintains a loop counter n that is used to select the receive specification of the HTE being searched for. At step (541) the hash search sequencer (450) initializes the loop counter n to zero, and clears the found status signal (433).

The first step of the loop is step (542), here the wildcard combination of the HTE's receive specification is selected. The wildcard select signals (461 & 462) are controlled by the hash search sequencer and are assigned values corresponding to the value of n. The SNN wildcard select signal (461) is asserted for n equal to one or three, and the tag wildcard select signal (462) is asserted for n equal to two or three. At step (543), the initial search index of the HTE to be searched for is calculated. The receive specification is made up of three parts: the SNN, Comm and Tag receive specifications. The SNN receive specification (465) is the result of logically ORing the output (463) of the SNN register (365) with the SNN wildcard select signal (461) by the OR gates (464). The Tag receive specification (466) is simply the output of the Comm register (366). The Tag receive specification (470) is the result of logically ORing the output (468) of the Tag register (367) with the Tag wildcard select signal (462) by the OR gates (469). It is convenient to merge the SNN receive specification (465) and the Comm receive specification (466) to create a combined SNN & Comm receive specification (467). Then, to generate the initial search index, the two parts of the receive specification, the combined SNN & Comm receive specification (467) and the Tag receive specification (470), must be hashed by the hash function circuit (471). The output of the hash function circuit (471) is selected via a selector (472) and ANDed by AND gates (474) with a mask value. This mask value is generated by a mask circuit (473) from the value in the Size register (253) and is used to limit the range of possible index values, thus limiting the size of the hash table. The masked value is latched by the Index register (475) which then holds the initial search index of the first HTE to be checked.

The innermost loop of the HTE search algorithm is entered at step (544). The index value in the Index register (475) is selected via selector (476), multiplied by the size in bytes of an HTE by the multiplier circuit (477), and added to the base address of the hash table contained in the HTBPtr register (252) by the adder (478) to give the HTEPtr signal (431). Then, at step (545), the HTEPtr signal (431) is forwarded to the receiver DMAC (361). and DMA control signals (432) between the hash search sequencer (450) and the receiver DMAC (361) are used to request that the HTE be read from local memory (4). Upon arrival of the HTE via the bus (6), the first word, containing the HTE's SNN (141) and Comm (142) fields, is compared with the combined SNN & Comm receive specification (467) using an equal comparator (481). If equal, S0 status register (482) is set, or else it is cleared. The second word, containing the HTE's Tagfield (143) is compared with the Tag receive specification (470) using another equal comparator (483). If equal, the S1 status register (484) is set, or else it is cleared. The third and fourth words of the HTE that contain the Ptr (144), C (145), P (146), HV (147) and Time (148) fields are latched in the Ptr (452), HC (453), P (454), HV (455) and Time (456) registers, respectively, of the HTE read buffer (451).

At step (546), the output of the HV register (455), called the HTE valid signal (486), is ANDed using an AND gate (489) with the S0 (482) and S1 (484) status registers, the output of the gate (489) giving a matched signal (490). This matched signal (490) indicates that the HTE has been found, the HTE is valid and has a matching receive specification, but may or may not have a valid posting chained from it. The matched signal (490) is ORed, using an OR gate (493), with the invert of the HTE valid signal (486) to give an end of search signal (494) that is forwarded to the hash search sequencer (450). A search for an HTE terminates upon finding the HTE being searched for, or upon finding an invalid HTE. The end of search signal (494) thus indicates that no more HTEs need to be fetched with respect to the search for the HTE with the particular receive specification.

At step (547), the hash search sequencer tests the end of search signal (494), and, if it is not asserted, the flow moves to step (548) to fetch and check the next HTE. At step (548), the index of the next HTE to be checked is calculated. The hash search sequencer (450) selects, via the selector (472), the value of the Index register (475) incremented by an incrementer (480). This value is then masked, using the AND gates (474), with the mask value output from the mask circuit (473), and is then latched again into the Index register (479). Incrementing and then masking the value of the Index register (475) gives the index of the next HTE in the hash table, wrapping around to the beginning of the hash table if the size limit of the hash table was exceeded. The flow then loops back to step (544) to fetch the next HTE. Software must guarantee that the hash table always contains at least one invalid HTE so as to prevent the possibility of the hash table sequencer entering an infinite loop.

If the end of search signal (494) was asserted at step (547), then the flow continues with step (549). A matching posting signal (492) is generated by ANDing the matched signal (490) using another AND gate (491) with the HC bit register (453). An Older signal (496) is generated by the comparator (495) and is asserted if the value of Time (456) is less than MTime (460). These signals also go to the hash search sequencer (450). At step (550), the search sequencer checks whether a valid HTE with a valid posting was located and whether the posting is older than the oldest one yet found. This is true if the matching posting signal (492) is asserted and if either the found status signal (433) is not asserted or if the Older signal (496) is asserted. If true, then at step (551) the Found status signal (433) is asserted, and the contents of the Ptr (452), P (454), Time (456) and Index (475) registers are copied to the MPtr (458), MP (459), MTime (460) and MIndex (479) registers, respectively.

Flow then continues with step (552) where n is incremented by one. If at step (553), n is less than four, indicating that not all of the receive specification wildcard permutations have been tried, then flow loops back to step (542) to start the search for the HTE with the next receive specification variation.

If n equals four, then the searches are complete. At step (554), the hash search sequencer (450) selects the MIndex register (479) via the selector (476) and then asserts the search complete signal (416). If the found signal (433) was previously asserted, meaning that an HTE with a valid matching posting was found, then the EITEPtr (431) signal corresponds to the address pointer of the HTE with the oldest matching valid posting, and the MPtr (437) and MP (436) signals, from the MPtr (458) and MP (459) registers, correspond to the HTE's Ptr (144) and P (146) fields, respectively. Finally, at step (555), the hash search sequencer asserts the search complete signal (416), signaling to the receive sequencer (450) that the hash table search controller (363) has completed the search request.

Returning to the description of the rest of the receive circuit, upon assertion of the search complete signal (416), the flow of the receive circuit resumes at step (528). The found signal (433) from the hash table search controller (363) is checked. To do this, the search complete signal (416) is ANDed with the invert of the found signal (433) by an AND gate (434), the output (435) being connected to the NM interrupt status bit (275). Thus, if a search is not successful, the NM interrupt status bit (275) is set at step (529), indicating to software that no matching HTE with a valid receive request posting could be found. The found signal (433) also goes to the receive sequencer (360) and in the same case, the receive sequencer (360) also clears the RS activity status bit (263) at step (530). Flow then returns to the beginning at step (521), and the input port (362) waits to receive the start of the next message header.

If an HTE was found, then flow moves on to step (531) in which a posted RCW or PCW is fetched, the posted RCW is unposted, a pool RCW is allocated, data pool space is allocated, as may be required according to the type of receive operation to be performed, and the posted RCW or pool RCW is updated to indicate that reception of a message has commenced.

Figure 23:
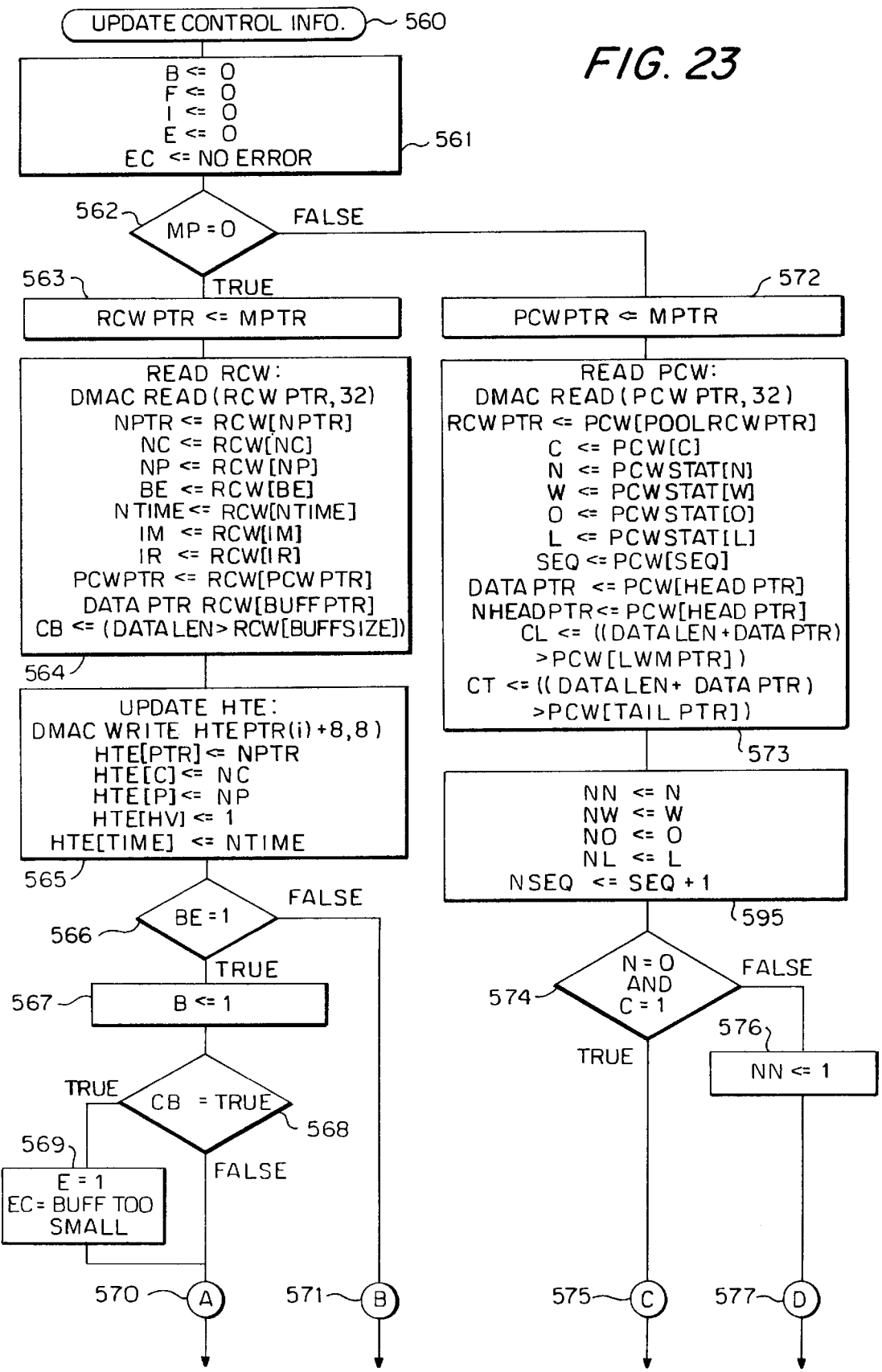
FIG. 23 is a first part of a flow chart describing the operation of the receive circuit relating to the start of message reception.
Figure 24:
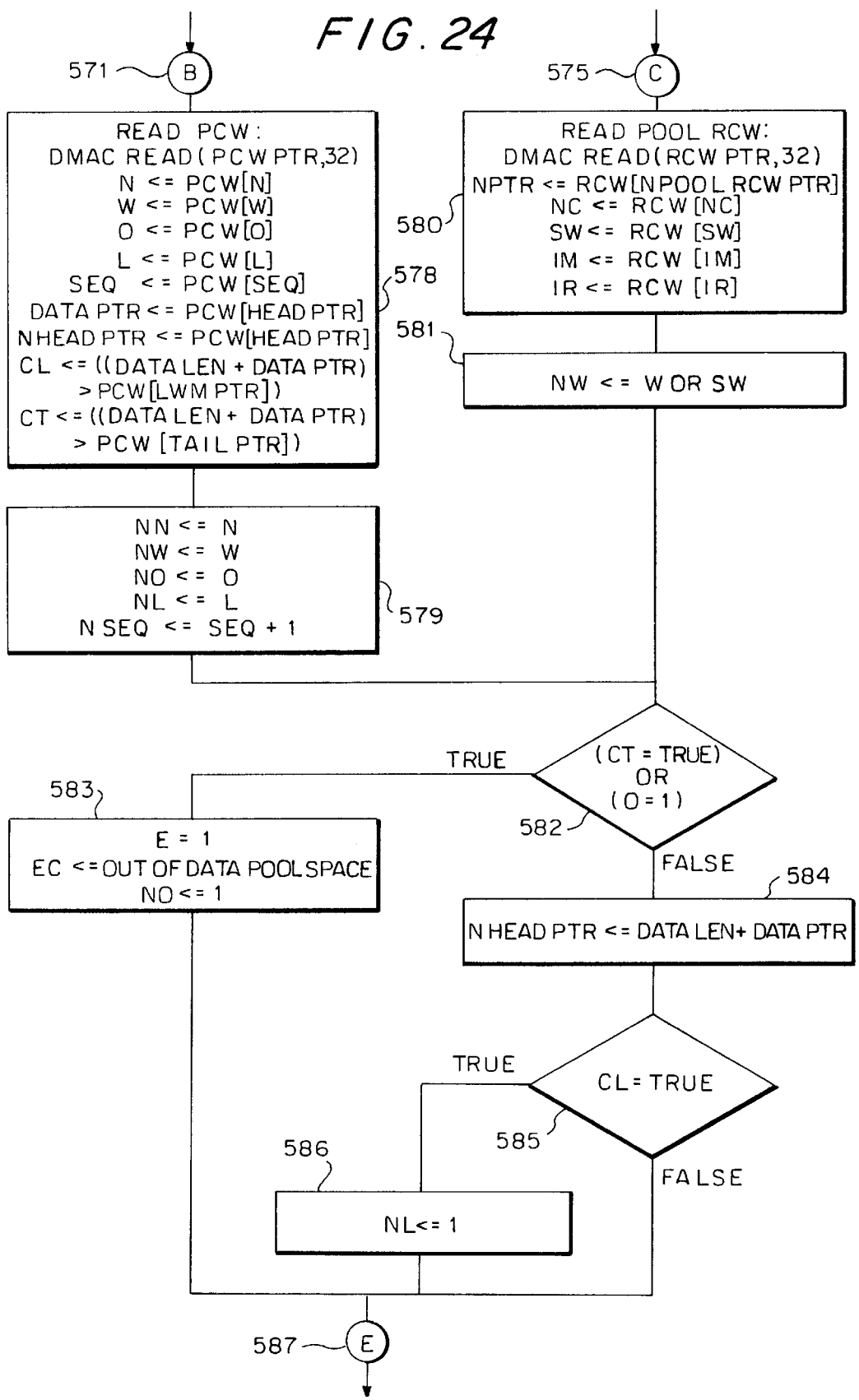
FIG. 24 is a second part of the flow chart describing the operation of the receive circuit relating to the start of message reception.
Figure 25:
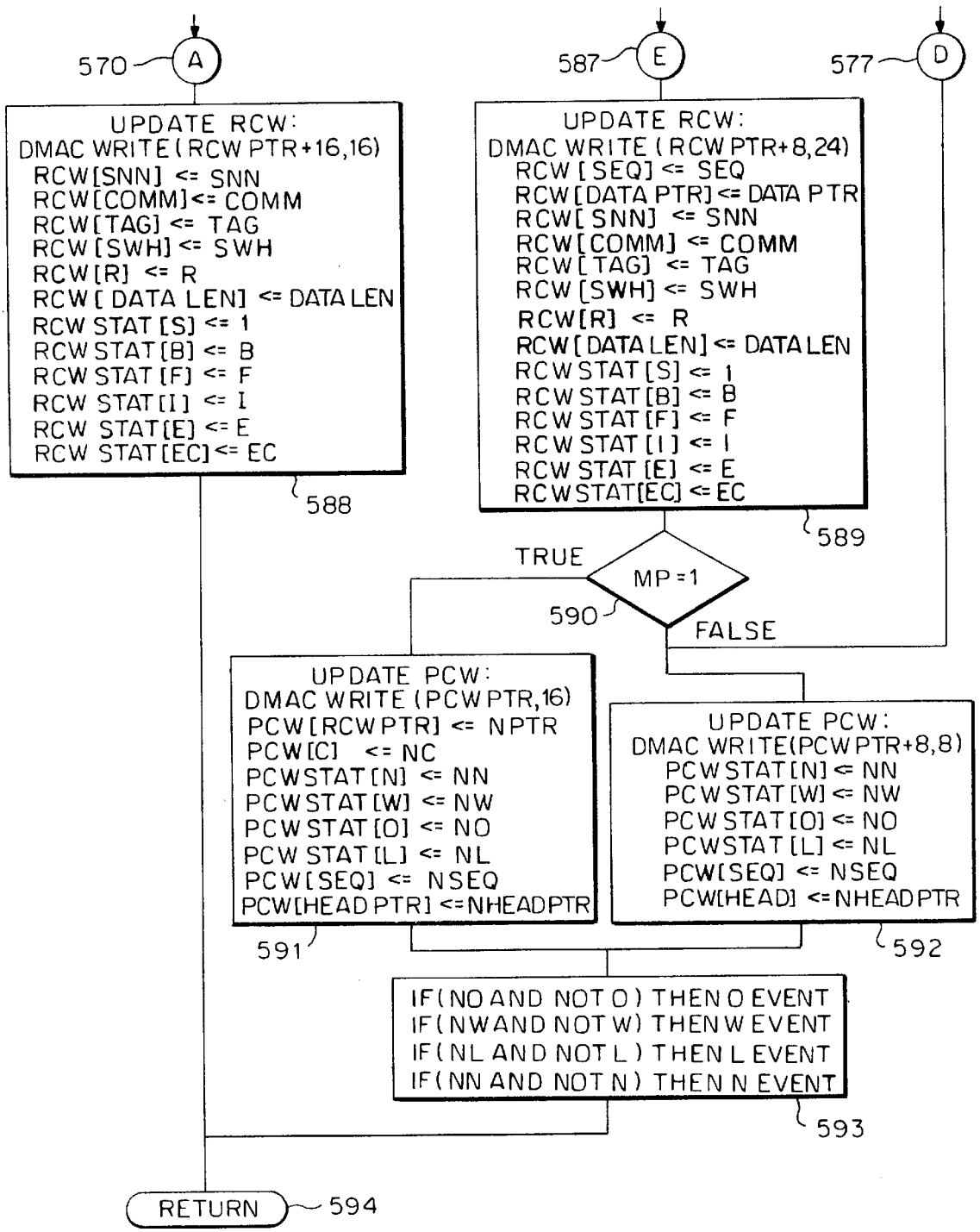
FIG. 25 is a third part of the flow chart describing the operation of the receive circuit relating to the start of message reception.

This step is in fact a more complicated subroutine and is expanded with its flow described in greater detail by FIGS. 23, 24 and 25. For ease of readability, the flow has been split across these three figures and the points in the flow marked A (570), B (571), C (575), D (577) and E (587) in these figures indicate where the flow continues on to a following figure. The initial step of the subroutine is step (560). The receive circuit maintains various statuses that relate to the reception of the current message. These statuses are held in the S (383), B (384), F (385), I (386), E (387) and EC (388) registers of the receive status buffer (382) and are later written by the receive circuit to the posted RCW's S (207), B (208), F (209), I (210), E (211) and EC (212) fields, or in the case of a pool RCW, to the pool RCW's S (244), B (249), F (245), I (246), E (247) and EC (248) fields, to indicate the receive status of the message to software. The S bit register (383) is hard wired with a value of '1' as the receive circuit never needs to write an RCW's S field with an unset value, it is used to indicate to software that the receive operation has been started. The B bit register (384) is set when the receive operation uses the buffer specified by a posted RCW whose BE bit field (174) is set. The F bit register (385) is set when finishing the receive operation. I (386) is set if an interrupt is to be requested as determined by the posted RCW's IR bit (178) or pool RCW's IR bit (225). The E bit (387) is set if and when an error condition is detected, in which case the EC register (388) is also set with an error code that describes the type of error detected. At step (561), the B (384), F (385), I (386), E (387) and EC (388) registers are all cleared to the unset state. At step (562), the receive sequencer (360) tests the MP bit signal (436) from the hash table search controller to determine whether a posted RCW or PCW was found. We will initially consider the case where the MP bit (436) is clear, in which case the search resulted in a match to an HTE containing a pointer to a posted RCW. We will later return to consider the case where the MP bit (436) is set. The address pointer to the posted RCW is output from the hash search controller via the MPtr signal (437), and is latched by the RCWPtr register (369) at step (563), the output (439) of which goes to the receiver DMAC (361). The receive sequencer (360) then requests the receiver DMAC (361), via DMA control signals (419), to fetch the posted RCW from local memory (4) at step (564). The posted RCW's data fields are returned via the bus (6). The next link buffer (371) is used to temporarily hold the link information as read from a posted RCW or from a pool RCW. In the case of a posted RCW, as in step (564), the NPtr (372), I\C (373), NP (374) and NTime (376) registers within the nextlink buffer (371) are latched from the respective fields of the posted RCW as it is read via the bus (6), and the NHV (375) has a hard wired binary value of '1' and is not modified. The BE (174), IM (177), IR (178), PCWPtr (179) and BuffPtr (180) fields of the posted RCW are latched in the BE (378), IM (380), IR (381), PCWPtr (368) and DataPtr (407) registers, respectively. The BuffSize field (181) of the posted RCW is not latched directly in to a register, but instead, as it arrives on the bus (6), it is compared by a comparator (405) with the output (440) of the DataLen register. The result of the compare operation is latched in the CB status bit register (406). The DataLen register contains the length value of the message data field, and if this value is bigger than the value of the posted RCW's BufSizefield (181), then the CB status bit register (406) will be set indicating that the buffer attached to the posted RCW is too small to hold all of the message data.

At step (565) the posted RCW is unposted. The receive circuit accomplishes this by either copying the chaining information relating to the next posted RCW or PCW to the HTE, or if there are no chained posted RCWs or PCWs, by invalidating the fields that relate to the current posted RCW. To do this, the receive sequencer (360) requests the receiver DMAC (361) to write the contents of the next link buffer (371) to the HTE pointed to by the HTEPtr output (431) from the hash table search controller (363). The NPtr (372), NC (373), NP (374), NHV (375) and NTime (376) register values are written to the Ptr (144), C (145), P (146), HV (147) and Time (148) fields of the HTE, respectively. Writing the HV field (147) with the binary value of '1' has the effect of ensuring that the HTE remains valid. Even if there are no chained postings, as is the case if the NC register (373) is clear, it is still important that the HTE remains valid to ensure that future searches of the hash table for different HTEs will still be able to locate them. If the HTE were invalidated in the case that there were no chained posted RCWs or PCWs, then future searches may terminate early upon fetching the invalid HTE instead of successfully finding a valid matching HTE. At step (566) the value of the BE (378) or buffer enable is tested by the receiver sequencer (360). If set, the posted RCW's BuffPtr (180) and BuffSize (181) fields were valid and thus the DataPtr (407) and CB (406) registers are valid. We will consider for the moment the case where the BE bit (378) was set and return later to describe the case where the BE bit (378) is clear. Flow continues with step (567) where the B bit register (384) of the receive status buffer (382) is set by the receiver sequencer (360) to indicate that the RCW's data buffer was valid. At step (568), the value of the CB status bit (406) is tested by the receive sequencer. If set, the posted RCW's buffer is too small, and at step (569) the receive sequencer (360) sets the E (387) and EC (388) registers of the receive status buffer (382) to indicate that an error has occurred because the receive buffer was too small to be able to hold the message data. Irrespective of whether CB (406) was set, flow moves on to step (588) at which point the posted RCW in local memory (4) is updated by the receive circuit. The receive sequencer (360) requests the receiver DMAC (361) to update the posted RCW which is pointed to by the RCWPtr register (369). The values of the message header fields contained within the SNN (365), Comm (366), Tag (367), SWH 402), R (403), DataLen (404) registers are written to the SNN (201), Comm (202), Tag (203), SWH (204), R (205) and DataLen (206) fields of the posted RCW, and the S (383), B (384), F (385), I (386), E (387) and EC (388) registers of the receive status buffer (382) are written to the posted RCW's S (207), B (208), F (209), I (210), E (211) and EC (212) fields. Flow then moves on to step (594) which corresponds to the completion of the starting of a receive phase. We will return later to describe the flow of the receive circuit that follows this step once we have completed the descriptions of the other cases that we earlier postponed.

In the case where the BE bit (378) was clear at step (566), flow moves on to step (578). At this point in the flow, the receive circuit has not yet determined where to write the message data. It must first allocate space from a data pool in order to be able to receive the message data. The PCWPtr register contains the PCWPtr field (179) from the posted RCW that specifies a particular PCW. The data pool to be used is managed by this PCW. The output (438) of the PCWPtr register (368) goes to the receiver DMAC (361), and at step (578) the receive sequencer (360) requests the receive DMAC (361) to fetch the PCW, which is then returned from local memory (4) via the bus (6). The PCW's N (153), W (154), O (155), L (156) and Seq (157) fields are latched by the N (390), W (391), O (392), L (393) and Seq (394) registers of the PCW status buffer (389). The PCW's HeadPtr field (158) is latched by both the DataPtr register (407) and by the NHeadPtr register (413). The adder (408) sums the output (441) of the DataPtr register (407) with the output (440) of the DataLen (404) register, the adder's output (409) being the new value of the data pool's head pointer. The comparator (410) is used to check if the new head pointer value (409) exceeds the values of the LWMPtr (160) or TailPtr (159) fields of the PCW, these fields being in different words of the PCW and thus arrive on different cycles of the bus (6). The output from the comparator (410) is latched by the CL (411) and CT (412) status bit registers such that CL (411) is set if the LWMPtr was exceeded and CT (412) is set if the TailPtr was exceeded. Then, at step (579), the receive sequencer copies the values of the N (390), W (391), O (392) and L (393) registers to the NN (397), NW (398), NO (399) and NL (400) registers of the PCW write status buffer (396), and increments the value contained in the Seq register (394) using an incrementer (395) and latches it in the NSeq register (401) of the PCW write status buffer (396). The PCW write status buffer (396) is used to buffer writes to the PCW, the NN (397), NW (398), NO (399), NL (400) and NSeq (401) registers containing the new values of the PCW's N (153), W (154), O (155), L (156)

and Seq (157) fields to be written. Flow then proceeds with step (582) where the receive circuit checks for any data pool allocation errors. If the O bit register (392) is set, then the PCW's data pool has already suffered a data pool overflow error. If the CT bit (412) is set, then there is insufficient data pool space to allocate space to receive the data of the current message. In either of these cases, datapool space cannot be allocated, and at step (583), the receiver sequencer (360) sets the E (388) and EC (388) registers to indicate that an out of datapool space error was detected and that no space could be allocated. The receive sequencer (360) also sets the NO bit register (399), so that when the PCW is written, the PCW's O bit field (155) will be set to indicate that a datapool overflow error was detected. If no data pool overflow error was detected, then the allocation was successful, and at step (584), the receive sequencer causes the NHeadPtr register (413) to latch the new value of the data pool head pointer output from the adder's output (409). Also, if there was no data pool overflow error, the receive sequencer tests the CL status bit (411) at step (585), and if set, sets the NL bit (400) at step (586) to indicate that the head pointer has exceeded the low watermark. Irrespective of whether datapool space was successfully allocated or not, flow continues with step (589) at which point the posted RCW in local memory is updated by the receive circuit. The receive sequencer (360) requests the receiver DMAC (361) to write the posted RCW, which is pointed to by the RCWPtr register (369). The Seq (394) and DataPtr (407) register values are written to the Seq (199) and Datapointer (200) fields of the posted RCW, the values of the message header fields contained within the SNN (365), Comm (366), Tag (367), SWH (402), R (403), DataLen (404) registers are written to the SNN (201), Comm (202), Tag (203), SWH (204), IR (205) and DataLen (206) fields of the posted RCW, and the S (383), B (384), F (385), I (386), E (387) and EC (388) registers of the receive status buffer (382) are written to the posted RCW's S (207), B (208), F (209), I (210), E (211) and EC (212) fields. At step (590), the receiver sequencer (360) again tests the value of the MP signal (436) from the HTE search controller (363). Our description so far has been for the case that this signal was clear and so, for this case, flow moves on to step (592) at which point the PCW in local memory is updated by the receive circuit. The receive sequencer (360) requests the receiver DMAC (361) to write the PCW, which is pointed to by the PCWPtr register (368). The values contained within the NN (397), NW (398), NO (399), NL (400) and NSeq (401) registers of the PCW write status buffer (396) and the value contained within the NHeadPtr register (413) are written to the N, W, O, L, Seq and HeadPtr fields of the PCW via the bus (6). When the PCW write operation is completed, the receive sequencer (360) asserts the PCWIRQ signal (420) at step (593). This signal is ANDed by four AND gates (421) with each of the outputs of NN (397), NW (398), NO (399) and NL (400) registers, and with each of the inverted outputs of N (390), W (391), O (392) and L (393) registers, respectively. The four output signals go to set the PN (271), PW (272), PO (273) and PL (274) interrupt status bits, respectively. Thus, when the receive circuit sets any of the N, W, O or L bits of a PCW that were previously clear, the corresponding interrupt request status bit is set, informing software of any warning or error conditions relating to the PCW. Flow then moves on to step (594) which corresponds to the completion of the starting receive phase for this case.

We will now return to step (562) to describe the flow of the receive circuit in the case where the MP signal (436) from the hash table search controller was set. In this case, the search resulted in a match to an HTE containing a pointer to a posted PCW and flow moves on to step (572). The pointer to the posted PCW is output from the hash search controller via the MPtr signal (437), and is latched by the PCWPtr register (368) at step (572). The output (438) from the PCWPtr register (368) goes to the receiver DMAC (361), and the receive sequencer then requests the receiver DMAC (361) to fetch the posted PCW from local memory (4) at step (573). The PCW's data fields are returned via the bus (6). The PCW's RCWPtr and C fields are latched by the RCWPtr (369) and C bit (370) registers. The PCW's N, W, O, L, Seq fields are latched by the N (390), W (391), O (392), L (393) and Seq (394) registers of the PCW status buffer (389). The PCW's HeadPtrfield is latched by both the DataPtr register (407) and by the NHeadPtr register (413) and, as described for the case of a posted RCW without an attached data buffer above, the CL (411) and CT (412) status bit registers are set such that CL (411) is set if the LWMPtr was exceeded by the new data pool head pointer, and CT (412) is set if the TailPtr was exceeded by the new data pool head pointer. At step (595), the receive sequencer copies the values of the N (390), W (391), O (392) and L (393) registers to the NN (397), NW (398), NO (399) and NL (400) registers of the PCW write status buffer (396), and increments the value contained in the Seq register (394) using an incrementer (395) and latches it in the NSeq register (401) of the PCW write status buffer (396). Then, at step (574), the receive sequencer (360) checks whether any pool RCWs are available. If the N bit register (390) is set, it means that an error due to a lack of pool RCWs was previously detected. If the C bit (370) is clear, it means that the PoolRCWPtr field that was latched in to the RCWPtr register (369) was invalid and that there are no pool RCWs chained from the PCW. If either the N bit (390) is set or the C bit (370) is clear, the receive sequencer (360) sets the NN bit (397), and flow goes to step 592 which writes the PCW back to local memory, as described earlier with respect to the receive of a posted RCW without an attached buffer. In this case though, if the N bit was not already set, the receive circuit sets the PCW's N bit and the PN interrupt status bit (271) indicating an error due to a lack of pool RCWs.

Returning to the description of step (574) of the flow, if there was a pool RCW available, then flow proceeds to step (580) where the pool RCW is fetched from local memory (4). The RCWPtr register (369) contains the pointer to the pool RCW and its output (439) goes to the receiver DMAC (361). The receive sequencer (360) requests the receive DMAC (361) to fetch the pool RCW which subsequently arrives via the bus (6). In the case of a receive using a posted PCW, the next link buffer (371) is used to temporarily hold the link to the next pool RCW and the NPoolRCWPtr and NC fields from the pool RCW are latched in the NPtr (372) and NC (373) registers of this buffer. The SW, IM and IR fields of the pool RCW are latched in the SW (377), IM (380) and IR (381) bit registers. A pool RCW with the SW bit field set is an indication that the chain of pool RCWs is becoming short, and if the receive circuit fetches such a pool RCW, it should warn software. At step (581), if the SW (377) bit is set, the receive sequencer sets the NW bit (398) that is later written back to the W bit field of the PCW. Flow then proceeds with step (582) where the receive circuit checks for any datapool allocation errors as was described above for the case of a receive using a posted RCW without an attached buffer. Flow continues in the same manner as before except that at step (589), the pool RCW is updated instead. At step (591), the MP signal (436) is again tested. This. part of the description of the flow has, so far, been for the case where this signal was set, and so, for this case, flow moves on to step (591) at which point the PCW in local memory is updated by the receive circuit. The receive sequencer (360) requests the receiver DMAC (361) to write the PCW which is pointed to by the PCWPtr register (368). The values contained within the NPtr (372) and NC (373) registers are written to the PoolRCWPtr and C fields of the PCW via the bus (6). The values contained within the NN (397), NW (398), NO (399), NL (400) and NSeq (401) registers of the PCW write status buffer (396) and the value contained within the NHeadPtr register (413) are written to the N, W, O, L, Seq and HeaderPtr fields of the PCW. When the PCW write operation is completed flow continues with step (593), which was described above when describing the case of a receive using a posted RCW without an attached buffer. Flow then moves on to step (594), which corresponds to the completion of the starting a receive phase for this case.

Figure 26:
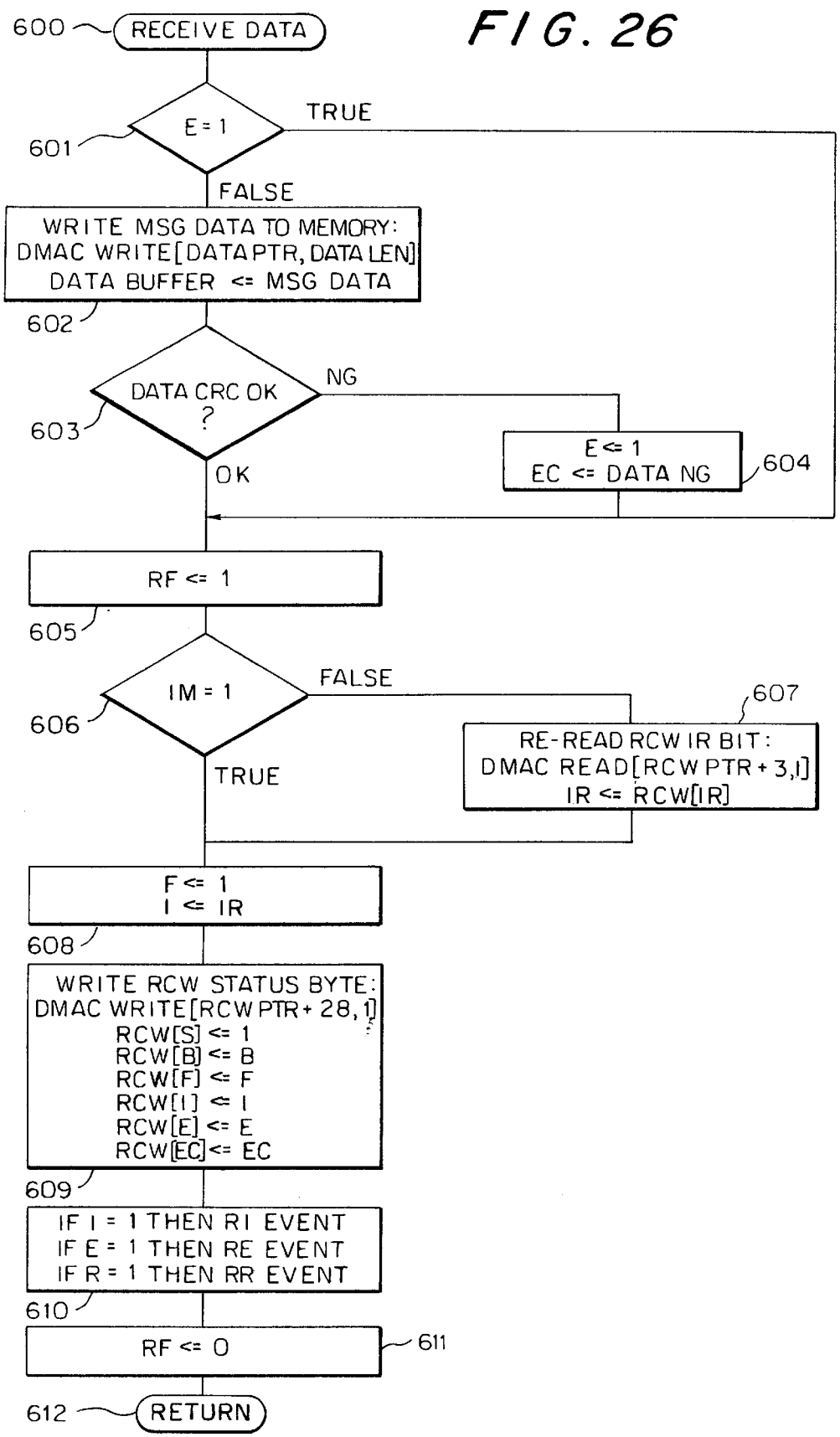
FIG. 26 is a flow chart describing the operation of the receive circuit relating to reception of message data and finishing reception of a message.

Above we have described all possible variations that lead to step (594). Flow then returns to step (532) in FIG. 20 where the receive sequencer clears the starting receive activity bit (263). At step (533) the receive sequencer checks again for an error due to a lack of a pool RCW, which is the case if the MP signal (436) is asserted and if either N (390) is set or C (370) is clear. If this condition is found, its true flow then returns to the beginning at step (521), and the input port waits to receive the start of the next message header. If no error was detected at step (533), then the value in the RCWPtr register (369) points to either a valid posted RCW or a valid pool RCW. Flow then proceeds to step (534) which is where data is written to the buffer and the final status is written to the posted RCW or pool RCW. This step corresponds, in fact, to a more complicated flow that is shown in FIG. 26 and starts from step (600). At step (601), the receive sequencer tests the E bit (387), and if it is clear, the DataPtr register (407) is valid and contains an address pointer to a buffer in local memory (4) that is sufficient in size to write message data of a length value contained in the DataLen register (404). The output (441) of the DataPtr register (407) and the output (440) of the DataLen register (404) go to the receiver DMAC (361). At step (602) the receive sequencer (360) requests the receiver DMAC (361) to write the message data from the input port (362) to local memory (4) via the bus (6). If, upon completion of the write operation at step (603), a data CRC error is detected by the input port (362), and the receive sequencer sets the E (387) and EC (388) registers to indicate that a data error has occurred at step (604). In any case, error or no error, flow continues with step (605) where the completion phase of the receive operation is entered.

Software can control whether the completion of any particular receive request should cause an interrupt request to the instruction processor. To cause an interrupt, software sets the IR bit of the corresponding posted RCW or pool RCW. This IR bit is read by the receive circuit, and if set, upon completion of the receive request, an interrupt request is issued. It is often the case that software does not know whether an interrupt request will be required right up until completion of the receive request. For example, in a multi-tasking software environment, a task that is waiting for completion of a receive request may be able to perform other useful work, but if there is no more useful work to be done by the software task until the message is completed, then the task should sleep. While sleeping, the IP's processing power is available for other tasks that it might be able to perform as useful work. Before sleeping, the task sets the posted RCW or pool RCW's IR bit, so that upon completion of the receive request, the task may be awakened and continue performing useful work. In this case, the IR bit may be set dynamically by software at any time right up until completion of the receive. This means that the receive circuit must read the posted RCW or pool RCW a second time to determine the state of the IR bit at completion of the receive. Unfortunately, this second read request by the receive circuit may waste time and increase the delay before the receive actually can be completed. The present invention includes an extra field, the IM bit field, in each posted RCW and pool RCW to permit this second read request to be avoided when it is not necessary. The IM bit controls the mode of operation relating to the IR field. If IM is set by software, then the second read is not performed, and the value of the IR bit obtained from the first read request of the posted RCW or pool RCW is used. In this case, software may not dynamically modify the state of the IR bit. If the IM bit is cleared by software, the value of the IR field is refetched upon completion of the receive. To permit software to test whether a modification to the IR field will be seen by the receive circuit, a finishing receive activity bit (264) is provided within the receive circuit, which the software can access via the bus (6), and the posted RCWs and pool RCWs are provided with an I bit field, which reflects the condition of the IR bit as read by the receive circuit. The finishing receive activity bit (264) is set by the receive circuit before the second read request to refetch the IR bit is issued and is cleared upon the final write of the I bit to the posted RCW or pool RCW. The software, upon setting the IR bit of a posted RCW or pool RCW, should poll the finishing receive activity bit (264) and wait for it to clear. After the finishing receive activity bit (264) clears, or if it was already clear, either the receive request has not been completed and the posted RCW or pool RCW corresponding to the receive operation has not yet been updated, in which case the IR bit modification by software will later be seen by the receive circuit, or the receive has been completed and the posted RCW or pool RCW corresponding to the receive operation has been updated for the last time, in which case the I status bit field reflects the status of the IR bit as observed by the receive circuit.

At step (605) the receive sequencer (360) asserts the RF signal (428) that sets the finishing receive activity bit (264). At step (606) the IM bit register (380), which holds the value of the IM field that was latched at the first read of the posted RCW or pool RCW, is tested, and if clear, the receive sequencer (360) requests the receiver DMAC (361) to refetch the posted RCW or pool RCW, and the IR bit field is relatched in the IR bit register (381). The receive sequencer then sets the F bit (385) and sets the I bit (386) to the contents of the IR bit (381) at step (608). At step (609) the receive sequencer (360) requests the receiver DMAC (361) to write the contents of the S (383), B (384), F (385), I (386), E (387) and EC (388) registers to the S, B, F, I, E and EC fields of the posted RCW or pool RCW. Then, at step (610), the receive sequencer (360) asserts the RCWIRQ signal (422). This signal is ANDed by three AND gates (425, 424 & 423) with each of the outputs of the I (400), IE (398) and R (403) registers, respectively. The output signals go to set the RR (270), RE (269) and I U (268) interrupt status bits, respectively. Thus, when the receive circuit sets any of the R, E or I bits of a RCW, upon finishing of the receive operation, the corresponding interrupt request status bit is set. The receive sequencer de-asserts the RF signal (428), clearing the finishing receive activity bit (264) at step (611) and at step (612) flow then returns to the beginning at step (521) in FIG. 20, and the input port waits to receive the start of the next message header.

From here, we will describe how communications software would typically perform message transfer between nodes in the system. This description describes the case for only one node, other nodes in the system being similar.

Initially software should create the necessary data structures in local memory. First, it should create a hash table in local memory that contains only invalid HTE entries. A node may execute multiple application software tasks, and to ensure separation of communications to and from different tasks, the Comm fields described above are split into two parts: a task identity field; and a communicator identity field. For each application software task to be executed by the node, a range of comm values should be assigned. These comm values represent the communicators identifying the communication contexts that may possibly be used by each application task. Then, for each application software task, it should create a datapool, a chain of empty pool RCWs and a single PCW that is used to manage these two resources. It is preferable, though not required, for each application software task to use separate PCWs, and thus separate data pools and chains of pool RCWs, as this allows communication errors due to pool overflows or out of pool RCW errors to be confined to the single application task responsible for causing the error. Communication software should then post the PCW in the hash table by creating a valid HTE that has a receive specification corresponding to a wildcard source, wildcard tag, and one of the comm values assigned to the application/task. The Time value in the HTE corresponding to the PCW should set the maximum value. This value represents receive requests into the future, corresponding to receive requests not yet issued. The PCW should be posted in the same way multiple times using separate HTEs for each value of comm assigned to the application software task. These postings of the PCW are used as default receive requests for messages that do not match any of the pending receive requests issued by application software. Such messages are received using a pool RCW and the message data is recorded in the data pool.

At any time after initialization of the memory structures, application software executing on a node may issue a request to transmit a message to the communication library software. The library software queues the request for sending by the transmit circuit. To queue a message transmit request, communication library software creates a TCW as described above that contains the Comm, Tag and buffer address of the data to be sent. Then it checks if the TCW corresponding to the previous message to be sent has been started by the transmit circuit by testing the TCW's S bit (132). If the S bit (132) is set, then software sets the address of the current TCW to the transmit circuit's NTCWPtr register (331) and sets the NC bit (333). If the S bit of the previous TCW is clear, then software sets the NIA's TH bit (158) to ensure that the transmit circuit does not start another TCW. Software then polls the TS activity status bit (261) and waits for it to be clear. Upon clearing, the transmit circuit is guaranteed not to start another TCW. Software again checks the previous TCW's S bit, and if clear, writes the pointer to the current TCW in the NTCWPtr field (121) and sets the NC bit field (122) of the previous TCW and then clears the TH bit (333). If the previous TCW's S bit was set during this time, then software was too late to chain the TCW from the previous one and must set the address of the current TCW to the transmit circuit's NTCWPtr register (331) and set the NC bit (333). In this manner software may queue any number of message transmit requests without having to wait for the transmit circuit to complete transmission of a message. If it would like to sleep and be awakened upon completion, software may, at any time, set the TCW's IR bit so that a processor interrupt request is issued upon completion of the transmit operation. Completion of a transmit operation can easily be tested by software by checking the status of the corresponding TCW's F status bit (132).

At any time after initialization of the memory structures, application software executing on a node may issue a receive request to the communication library software. The library software first searches the chain of pool RCWs that have been used by the receive circuit. These pool RCWs can readily be identified by the pool RCW's S bit (244) which is set if it has been used. These pool RCWs should be searched starting from oldest first so as not to violate the MPI message ordering requirements. If a pool RCW is found by software that contains SNN, Comm and Tag fields that match the receive request, then the request is satisfied. Software should then wait for the pool RCW's F bit (245) to be set to ensure that the receive is complete, and may then copy the data pointed to by the DataPtr field (237) to the application's buffer. If the message is not found in the chain of pool RCW's the receiver must create a posted RCW. This should contain both the specification of the users buffer in application space and also a valid pointer to the PCW. The posted RCWs BE bit (174) should be clear as initially this posted RCW is to be posted only provisionally and later the buffer will be enabled. Software should then calculate the hash value of the receive specification and search the hash table for the corresponding HTE. If the HTE is not found, software must create one. To do this, the receiver first sets the RH hold control bit (259) and then polls the RS activity bit (263) until it is clear. This ensures that the receive circuit will not start to search the hash table while software is modifying it. Software then writes the HTE to the hash table and places the timestamp and pointer to the posted RCW in the HTE and then clears the RH hold control bit (259). If an HTE was found, but nothing was chained from it, then the same procedure applies. However, but if another posted RCW or PCW was chained, then software should first set the RH hold control bit (259) and then poll the RS activity bit (263) until it is clear, then it should insert the posted RCW at the end of the chain of posted RCWs, but before any posted PCW. Software can do this by copying the NPtr, NC, NP and NTime of the last posted RCW in the chain to the corresponding fields of the RCW to be posted, and by setting the NC, NP, NPtr and NTime fields of the previous RCW to correspond to the timestamp end pointer to the posted RCW of the current receive request.

Software then clears the RH hold control bit (259) to re-enable operation of the receive circuit. Software then checks for a message that matches the receive request in any of the pool RCWs that have been used since the previous check. If the message has not been received, then software sets the BE bit (174) of the RCW to enable the buffer. Software then polls the RS bit (263) until it is clear and then checks the RCW's S (207) and B (208) bits to see if the buffer was successfully enabled before reception of the requested message starts. If the buffer was enabled after message reception started using the posted RCW, then the data will have to be copied by library software to the application buffer. If before the buffer was enabled the message was found to be received using a pool RCW, then the provisionally posted RCW should be unposted. For software to unpost a provisionally posted RCW, it should, as before, first set the RH hold control bit (259) and then poll the RS activity bit (263) until it is clear, then unlink the RCW from the HTE or the chain of posted RCWs. If another message was received using the provisionally posted RCW, in addition to the one requested, then the unlinked provisionally posted RCW should be treated as a used pool RCW.

Each used posted RCW without an attached buffer and each used pool RCW includes a Seq field. This Seq field is obtained from a count value that is copied from the PCW's Seq field, this count value being incremented by the receive circuit every time the PCW is updated by the receive circuit. Thus, this Seq field can be used to determine the relative order of messages received to pool RCWs and provisionally posted RCWs. The used provisionally posted RCW that was not unposted in time, should be inserted, at a position corresponding to the order of message reception, in the chain of used pool RCWs. Note that, in this case, it is not required to hold the operation of the receive circuit as these pool RCWs have already been used. If an application/task would like to sleep and be awakened upon completion of the receive request, the software may, at any time, set the pool RCW or posted RCW's IR bit so that a processor interrupt request is issued upon completion of the corresponding receive operation. Completion of a receive operation can easily be tested by software by checking the status of the corresponding posted RCW or posted RCW's F status bit.

There are many possible variations of the above embodiment that still use the present invention.

For example, instead of the transmit circuit taking the SNN header field from a node number register, it is possible for the SNN of a message header to be specified by the instruction processor on a per message basis by adding a SNN field to the TCW. This system is useful in the case that there are multiple application processes executing on a node, in which case SNN may be alternatively used to identify the source process of the message.

In other possible variations, some of the message header fields maybe omitted for systems that do not require them. For example, in a system that requires only the use of a single communication context, the Comm fields may be omitted. Alternatively, in systems that use applications that do not require the use of wildcards, the search algorithm may be simplified to search for only one possible HTE in the hash table.

The embodiment described above uses a hash table as a means to match incoming messages to posted receive requests, but it is also possible to use an associative memory to hold receive request postings, such an associative memory being supplied with the distinguishing fields of the message from the message header, and the associative memory returning the receive request or requests that match it. Again, this possible embodiment does not differ from the present invention.

In a system that uses software that does not require such strict order when matching messages to receive requests, it is not required to implement the timestamp fields or time comparators of the above embodiment. Again this possible variation of the above embodiment does not differ from the present invention.

Also, it is not required by the invention that message pools be provided. If receiving software always knows in advance which messages it will be receiving, no messages need be received to a message pool. Again, this possible embodiment does not differ from the present invention.

Implementation of a receive posting search mechanism in hardware considerably reduces message latency by reducing software overhead and simplifies implementation of message passing libraries such as those that follow the MPI standard (Message Passing Interface).

What is claimed is:

1. A computer system including a plurality of processing nodes interconnected by a message transfer network, each node comprising:

an instruction processor;

a transmit circuit to transmit messages to other processing nodes through the message transfer network, each said message comprising a header part and a data part, the header part having distinguishing fields that are used to distinguish messages;

a memory storage;

a plurality of postings in said memory storage, each posting comprising message specification fields corresponding to each distinguishing field of a message header part, the message specification fields selectively matching the distinguishing fields of a message, each posting further comprising a posted control field, said posted control field being used to control the operation of a receive circuit with respect to a message matching the posting; and a receive circuit comprising:

receive means to receive messages sent by other processing nodes through the message transfer network, search means, that upon receiving a message, searches for and locates from among a plurality of postings a posting having message specification fields that match corresponding distinguishing fields of said message being received, and receive control means, that upon locating a posting, uses said posted control field of said posting to control the operation of the receive circuit with respect to said message being received and to route said message being received to a destination defined in said posted control field.

2. The computer system according to claim 1, wherein said distinguishing field is a source field that identifies the source of the message, said message specification field is a source specification field, and said search means searches memory storage for a posting having a source specification field that matches the source field of the message being received.

3. The computer system according to claim 2, wherein said source specification field includes a value representing one of a specific source specification and a wildcard source specification, and said search means searches memory storage for a posting having either a specific source specification field that matches the source field of the message being received or a wildcard source specification field.

4. The computer system according to claim 1, wherein said distinguishing field is a tag field that is set by the instruction processor of a transmitting node, said message specification field is a tag specification field, and said search means searches memory storage for a posting having a tag specification field that matches the tag field of the message being received.

5. The computer system according to claim 4, wherein said tag specification field includes a value representing one of a specific tag specification and a wildcard tag specification field, and said search means searches said memory storage for a posting having either a specific tag specification field that matches the tag field of the message being received or a wildcard tag specification field.

6. The computer system according to claim 5, wherein said distinguishing field is a communicator field that is set by the instruction processor of the transmitting node, said message specification field is a communicator specification field, and said search means searches memory storage for a posting having additionally a communicator specification field that matches the communicator field of the message being received.

7. The computer system according to claim 5, wherein said distinguishing field is a source field that identifies the source of the message, said message specification field is a source specification field, and said search means searches said memory storage for a posting having additionally a source specification field that matches the source field of the message being received.

8. The computer system according to claim 5, wherein postings are valid hash table entries in a hash table in main storage, said search means searches for a posting that matches the message being received by searching for each of possible postings that match the message being received, these possible postings corresponding to each permutation of specific or wildcard message specification fields, each posting being searched for by first calculating the hash value of the message specification fields of the posting to be searched for, this hash value being used as an initial search index of a hash table entry into the hash table, and then checking each hash table entry, starting from the initial search index, until either an invalid hash table entry or the required posting is found, an invalid hash table entry signifying that the posting can not be found.

9. The computer system according to claim 8, wherein:

each posting additionally comprises a time field that indicates the relative age of each posting;

in the case where the search means finds more than one posting that matches the message being received, the search means uses the oldest posting as determined by the time fields of each posting.

10. The computer system according to claim 4, wherein said distinguishing field is a source field that identifies the source of the message, said message specification field is a source specification field, and said search means searches said memory storage for a posting having additionally a source specification field that matches the source field of the message being received.

11. The computer system according to claims 1, 4, 2 or 10, wherein:

postings are valid hash table entries in a hash table in main storage, said search means searches for a posting that matches the distinguishing fields of the message being received by first calculating the hash value of the message specification fields of the posting to be searched for, this hash value being used as an initial search index of a hash table entry into the hash table, and then checking each hash table entry, starting from the initial search index, until either an invalid hash table entry or the required posting is found, an invalid hash table entry signifying that the posting cannot be found.

12. The computer system according to claim 4, wherein said distinguishing field is a source field that identifies the source of the message, said message specification field is a source specification field, said source specification field is one of a specific source specification field and a wildcard source specification field, and said search means searches said memory storage for a posting having additionally either a specific source specification field that matches the source field of the message being received or a wildcard source specification field.

13. The computer system according to claim 1, wherein:

each posting additionally comprises a posting valid field that indicates whether the posted control field is active or used, said posting containing an active posted control field representing an active posting, and said search means searches memory storage for active postings only; and the receive circuit additionally comprises posting inactivation means, that upon location of a posting, modifies the corresponding posting valid field to indicate that said posting is used.

14. The computer system according to claim 13 wherein each posting additionally comprises a persistent control field that indicates whether the said posting is a persistent posting or a non-persistent posting; and said posting inactivation means only modifies the posting valid field of postings other than persistent postings.

15. The computer system according to claim 13, wherein:

the posted control field is a receive control word address pointer, there being a plurality of receive control words in memory storage;

each receive control word having a next receive control word address pointer and a next posting valid field indicating the validity of the next receive control word address pointer, these fields allowing a plurality of receive control words to be chained together with the last receive control word in the chain containing a next receive control word address pointer indicated as being invalid;

said receive control means, upon location of a posting, uses the receive control word address pointer of the posting to fetch a corresponding receive control word and uses said receive control word to control the operation of the receive circuit with respect to the message being received; and said posting inactivation means, upon fetching the receive control word, copies the corresponding next receive control word address pointer to the receive control word address pointer of the posting, and copies the corresponding next posting valid field to the posting valid field of the posting, the posting valid field being modified to indicate that the posting is used only when the last receive control word in said chain is fetched.

16. The computer system according to claim 15, wherein each receive control word additionally has a persistent control field that indicates whether the receive control word is persistent or non-persistent;

and said posting inactivation means only modifies the posting valid field upon fetching a receive control word that is indicated as being non-persistent.

17. The computer system according to claim 16, wherein:

the posted control field of a posting is a control word address pointer, this address pointer being either a receive control word address pointer of a non-persistent posting, or a pool control word address pointer of a persistent posting, there being a plurality of receive control words and pool control words in memory storage;

said receive control means, upon location of a non-persistent posting, uses the receive control word address pointer of the posting to fetch the corresponding receive control word and uses the receive control word to control the operation of the receive circuit with respect to the message being received;

and said receive control means, upon location of a persistent posting, uses the pool control word address pointer of the posting to fetch the corresponding pool control word and uses the said pool control word to receive the message being received.

18. The computer system according to claim 17, wherein:

there are additionally a plurality of data pools in memory storage, each being an area of free memory storage;

there are additionally a plurality of receive status word pools in memory storage, each receive status word pool containing a plurality of receive status words;

each pool control word contains all control information required to manage a data pool and a receive status word pool;

the receive circuit additionally has pool receive means to allocate a pool receive buffer from the data pool corresponding to the pool control word, to record the message data part of the message being received to said pool receive buffer, to allocate a pool receive status word from the receive status word pool corresponding to the pool control word and to record status and control information relating to the message being received in said receive status word.

19. The computer system according to claim 18, wherein:

each receive control word has an address pointer to a receive buffer in memory storage, a receive buffer enable field that enables use of the said receive buffer, and a pool control word address pointer to a pool control word to be used by the receive circuit in the case that use of the receive buffer is not enabled, the receive circuit has additional receive buffer means to write the data part of the message being received to said receive buffer in the case that the receive buffer is indicated as enabled, and, in the case of a receive using a receive control word whose receive buffer is not enabled, the pool receive means uses the pool control word address pointer to locate a pool control word, allocates a pool receive buffer from the data pool corresponding to said pool control word, and records the message data part of the message being received to said pool receive buffer.

20. The computer system according to claim 19, wherein:

each pool control word includes a receive sequence field, the receive control word additionally having receive status fields, and the pool receive means includes additional means to increment the receive sequence field upon reception of each message that uses pool control words, and means to record the current value of the receive sequence field in each pool status word written and in each receive control word whose receive buffer was not enabled.

21. The computer system according to claim 16, wherein:

the posted control field of a posting is a control word address pointer, this address pointer being either a receive control word address pointer of a non-persistent posting, or a pool control word address pointer of a persistent posting, there being a plurality of receive control words and pool control words in memory storage;

each receive control word contains a next control word address pointer, a next posting valid field indicating the validity of the next control word address pointer, and a next persistent control field indicating whether the next control word address pointer is a next receive control word address pointer or a next pool control word address pointer, these fields allowing a plurality of receive control words to be chained together with the last receive control word in the chain containing either a next control word address pointer indicated as being invalid, or a next pool control word address pointer corresponding to a chained persistent posting; and said posting inactivation means, upon fetching a receive control word, copies the corresponding next control word address pointer to the control word address pointer of the posting, copies the corresponding next persistent control field to the persistent control field of the posting, and copies the corresponding next posting valid field to the posting valid field of the posting, the persistent control field being modified to indicate that said posting is persistent only when the last receive control word in the chain is fetched and the next persistent control field of the last receive control word indicates that the next control word address pointer is a next pool control word address pointer, the posting valid field being modified to indicate that said posting is used only when there is no pool control word chained and the last receive control word in said chain is fetched.

22. The computer system according to claim 1, wherein:

the posted control field is a receive control word address pointer, there being a plurality of receive control words in memory storage; and said receive control means, upon location of a posting, uses the receive control word address pointer of the posting to fetch the corresponding receive control word and uses said receive control word to control the operation of the receive circuit with respect to the message being received.

23. The computer system according to claim 22, wherein:

each receive control word has an address pointer to a receive buffer in memory storage, and the receive circuit has additional receive buffer means to write the data part of the message being received to said receive buffer.

24. The computer system according to claim 23, wherein each receive control word additionally has a size field that indicates the size of said receive buffer, and the receive circuit has additional length checking means to compare the length of the message data part of the message being received to the size field corresponding to said receive buffer.

25. The computer system according to claim 22, wherein:

said receive control word additionally has receive status fields, and the receive circuit has additional receive status means to update the receive status fields of a receive control word with a status relating to the reception of the message being received.

26. The computer system according to claim 25, wherein:

the receive status means updates the said receive status fields once upon starting reception of the message being received and again upon finishing reception of the message being received, each update indicating the current reception status of the message.

27. The computer system according to claim 1, wherein:

the posted control field is an address pointer to a receive buffer in memory storage; and the receive circuit has additional receive buffer means to write a data part of the message being received to said receive buffer.

28. The computer system according to claim 27, wherein each posting additionally has a size field that indicates the size of said receive buffer, and the receive circuit has additional length checking means to compare the length of the message data part of the message being received to the size field corresponding to said receive buffer.

29. A computer system according to claim 5, wherein said distinguishing field is a source field that identifies the source of the message, said message specification field is a source specification field, said source specification field is one of a specific source specification field and a wildcard source specification field, and said search means searches said memory storage for a posting having additionally either a specific source specification field that matches the source field of the message being received or a wildcard source specification field.

30. A computer system according to claim 6, wherein said distinguishing field is a source field that identifies the source of the message, said message specification field is a source specification field, said source specification field is one of a specific source specification field and a wildcard source specification field, and said search means searches said memory storage for a posting having additionally either a specific source specification field that matches the source field of the message being received or a wildcard source specification field.

31. A computer system according to claim 29, wherein postings are valid hash table entries in a hash table in main storage, said search means searches for a posting that matches the message being received by searching for each of possible postings that match the message being received, these possible postings corresponding to each permutation of specific or wildcard message specification fields, each posting being searched for by first calculating the hash value of the message specification fields of the posting to be searched for, this hash value being used as an initial search index of a hash table entry into the hash table, and then checking each hash table entry, starting from the initial search index, until either an invalid hash table entry or the required posting is found, an invalid hash table entry signifying that the posting can not be found.

32. A computer system according to claim 31, wherein each posting additionally comprises a time filed that indicates the relative age of each posting;

in the case where the search means finds more than one posting that matches the message being received, the search means uses the oldest posting as determined by the time fields of each posting.

* * * * *